US011153518B2

(12) United States Patent
Sato

(10) Patent No.: US 11,153,518 B2
(45) Date of Patent: Oct. 19, 2021

(54) SOLID-STATE IMAGING ELEMENT AND IMAGING APPARATUS

(71) Applicant: SONY SEMICONDUCTOR SOLUTIONS CORPORATION, Kanagawa (JP)

(72) Inventor: Mamoru Sato, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 49 days.

(21) Appl. No.: 16/632,947

(22) PCT Filed: Jul. 19, 2018

(86) PCT No.: PCT/JP2018/027033
§ 371 (c)(1),
(2) Date: Jan. 22, 2020

(87) PCT Pub. No.: WO2019/026632
PCT Pub. Date: Feb. 7, 2019

(65) Prior Publication Data
US 2020/0221043 A1 Jul. 9, 2020

(30) Foreign Application Priority Data
Aug. 2, 2017 (JP) .............................. JP2017-149687

(51) Int. Cl.
H04N 5/355 (2011.01)
H04N 5/361 (2011.01)
(Continued)

(52) U.S. Cl.
CPC ......... H04N 5/35545 (2013.01); H04N 5/361 (2013.01); H04N 5/378 (2013.01); H04N 5/37455 (2013.01)

(58) Field of Classification Search
CPC ............... H04N 5/35545; H04N 5/361; H04N 5/37455; H04N 5/378; H04N 5/3698;
(Continued)

(56) References Cited

U.S. PATENT DOCUMENTS

2008/0211946 A1* 9/2008 Uchida ................ H04N 3/1568
348/294
2008/0258047 A1* 10/2008 Sakakibara ............... G01J 1/44
250/214 C
2012/0212657 A1* 8/2012 Mo ....................... H04N 5/3658
348/300

FOREIGN PATENT DOCUMENTS

JP 06-205297 A 7/1994
JP 2003-259218 A 9/2003
(Continued)

OTHER PUBLICATIONS

International Search Report and Written Opinion of PCT Application No. PCT/JP2018/027033, dated Sep. 11, 2018, 10 pages of ISRWO.

Primary Examiner — Lin Ye
Assistant Examiner — John H Morehead, III
(74) Attorney, Agent, or Firm — Chip Law Group

(57) ABSTRACT

The present technology relates to a solid-state imaging element and an imaging apparatus that provides an ample dynamic range. The solid-state imaging element includes a pixel array section and a readout load section. The pixel array section has a readout pixel and a reference pixel. A pixel signal proportional to an amount of incident light is read out from the readout pixel. The reference pixel has characteristics similar to those of the readout pixel. The readout load section forms a differential amplification circuit together with the readout pixel and the reference pixel and inputs, to the reference pixel, a pseudo-dark current signal corresponding to a dark current signal that occurs in the
(Continued)

readout pixel, thus canceling the dark current signal. The present technology is applicable to a CMOS image sensor.

13 Claims, 15 Drawing Sheets

(51) Int. Cl.
*H04N 5/3745* (2011.01)
*H04N 5/378* (2011.01)

(58) Field of Classification Search
CPC ............... H04N 5/36963; H04N 5/379; H04N 5/37452; H04N 5/363; H04N 5/3651; H04N 5/3655; H04N 5/3653; H04N 5/365; H04N 5/3575; H04N 5/357
See application file for complete search history.

(56) References Cited

FOREIGN PATENT DOCUMENTS

| | | |
|---|---|---|
| JP | 2008-219293 A | 9/2008 |
| JP | 2008-271280 A | 11/2008 |
| JP | 2012-175690 A | 9/2012 |
| JP | 2013-102288 A | 5/2013 |

\* cited by examiner

SOLID-STATE IMAGING ELEMENT AND IMAGING APPARATUS

CROSS REFERENCE TO RELATED APPLICATIONS

This application is a U.S. National Phase of International Patent Application No. PCT/JP2018/027033 filed on Jul. 19, 2018, which claims priority benefit of Japanese Patent Application No. JP 2017-149687 filed in the Japan Patent Office on Aug. 2, 2017. Each of the above-referenced applications is hereby incorporated herein by reference in its entirety.

TECHNICAL FIELD

The present technology relates to a solid-state imaging element and an imaging apparatus, and in particular, to a solid-state imaging element and an imaging apparatus that provides an ample dynamic range.

BACKGROUND ART

In CMOS (Complementary Metal Oxide Semiconductor) image sensors, it has been common to date to convert charge into voltage in an FD (Floating Diffusion) region and read out a pixel signal from the FD region by using a source follower (SF) that includes an amplifying transistor in the pixel. The signal read out from the pixel in such a manner is processed by a column circuit having AD (Analog Digital) converters and so on.

Amplification of the signal in a pixel section is effective in reducing input referred noise in the column circuit. For this reason, a readout technology has been proposed to form a differential amplifier without increasing the number of transistors in the pixel (refer, for example, to PTL 1 and PTL 2).

In the readout circuit whose differential amplifier is formed in such a manner for signal amplification in the pixel, a high conversion efficiency can be achieved in converting received light into an electric signal and reading out the electric signal, thus providing a low-noise and high-quality image from the pixel signal that has been read out.

CITATION LIST

Patent Literature

[PTL 1]
  JP 2008-271280A
[PTL 2]
  JP 2003-259218A

SUMMARY

Technical Problem

However, the above technology has been unable to provide an ample dynamic range in some cases.

For example, differential amplification type pixel amplification, i.e., a technology that achieves in-pixel amplification by forming a differential amplifier offers a larger gain than source follower type pixel amplification whose conversion efficiency is determined by a reciprocal of capacitance in the FD region, allowing for significant improvement in signal conversion efficiency. However, the technology that achieves in-pixel amplification by forming a differential amplifier has a drawback in that a pixel output voltage has a narrow pixel output voltage amplitude, i.e., a narrow signal dynamic range.

In the technology that achieves in-pixel amplification by forming a differential amplifier, a dark current component generated in the pixel is amplified with a high conversion efficiency. As a result, this dark current component restricts the dynamic range of the signal which would otherwise be acquired by imaging. It is difficult to provide a dynamic range in an imaging condition where a large dark current occurs such as during long accumulation and at high temperatures.

Specifically, we assume a differential amplification type pixel amplifier whose dynamic range is 400 mV. In this case, a differential amplification type pixel amplifier has a charge accumulation time of $1/30$ of a second. In an imaging condition where the CMOS image sensor temperature is 60 degrees (° C.), although the dark current component accounts for 1 mV of output voltage amplitude, it is possible to provide 399 mV as an imaging signal component.

On the other hand, in a standard imaging condition for a CMOS image sensor designed for monitoring camera, i.e., in an imaging condition where the charge accumulation time is one second and the CMOS image sensor temperature is 105 degrees (° C.), the dark current component accounts for 316 mV. As a result, the imaging signal component is limited to 84 mV or lower.

The present technology has been devised in light of the foregoing circumstances, and it is an object of the present technology to provide an ample dynamic range.

Solution to Problem

A solid-state imaging element of a first aspect of the present technology includes a pixel array section and a readout load section. The pixel array section has a readout pixel and a reference pixel. A pixel signal proportional to an amount of incident light is read out from the readout pixel. The reference pixel has characteristics similar to those of the readout pixel. The readout load section forms a differential amplification circuit together with the readout pixel and the reference pixel and inputs, to the reference pixel, a pseudo-dark current signal corresponding to a dark current signal that occurs in the readout pixel, thus canceling the dark current signal.

In the first aspect of the present technology, a pixel array section and a readout load section are provided in a solid-state imaging element. The pixel array section has a readout pixel and a reference pixel. A pixel signal proportional to an amount of incident light is read out from the readout pixel. The reference pixel has characteristics similar to those of the readout pixel. The readout load section forms a differential amplification circuit together with the readout pixel and the reference pixel and inputs, to the reference pixel, a pseudo-dark current signal corresponding to a dark current signal that occurs in the readout pixel, thus canceling the dark current signal.

An imaging apparatus of a second aspect of the present technology is an imaging apparatus similar to the solid-state imaging element of the first aspect of the present technology.

Advantageous Effect of Invention

The first and second aspects of the present technology provide an ample dynamic range.

It should be noted that the effect described here is not necessarily restrictive and may be any one of the effects recited in the present disclosure.

DESCRIPTION OF EMBODIMENTS

A description will be given below of embodiments to which the present technology is applied with reference to drawings.

First Embodiment

<Configuration Example of the Solid-State Imaging Element>

In the present technology, a dark current signal is detected from sufficiently light-shielded OPB (Optical Black) pixels and so on, and the dark current signal acquired by the detection is artificially generated and input to a differential amplification type pixel amplifier as a reference side signal. Such an arrangement allows the dark current component of the readout side signal to be canceled by the artificially generated dark current signal, a signal in phase with the dark current component, thus eliminating the restriction on the dynamic range.

Figure 1:
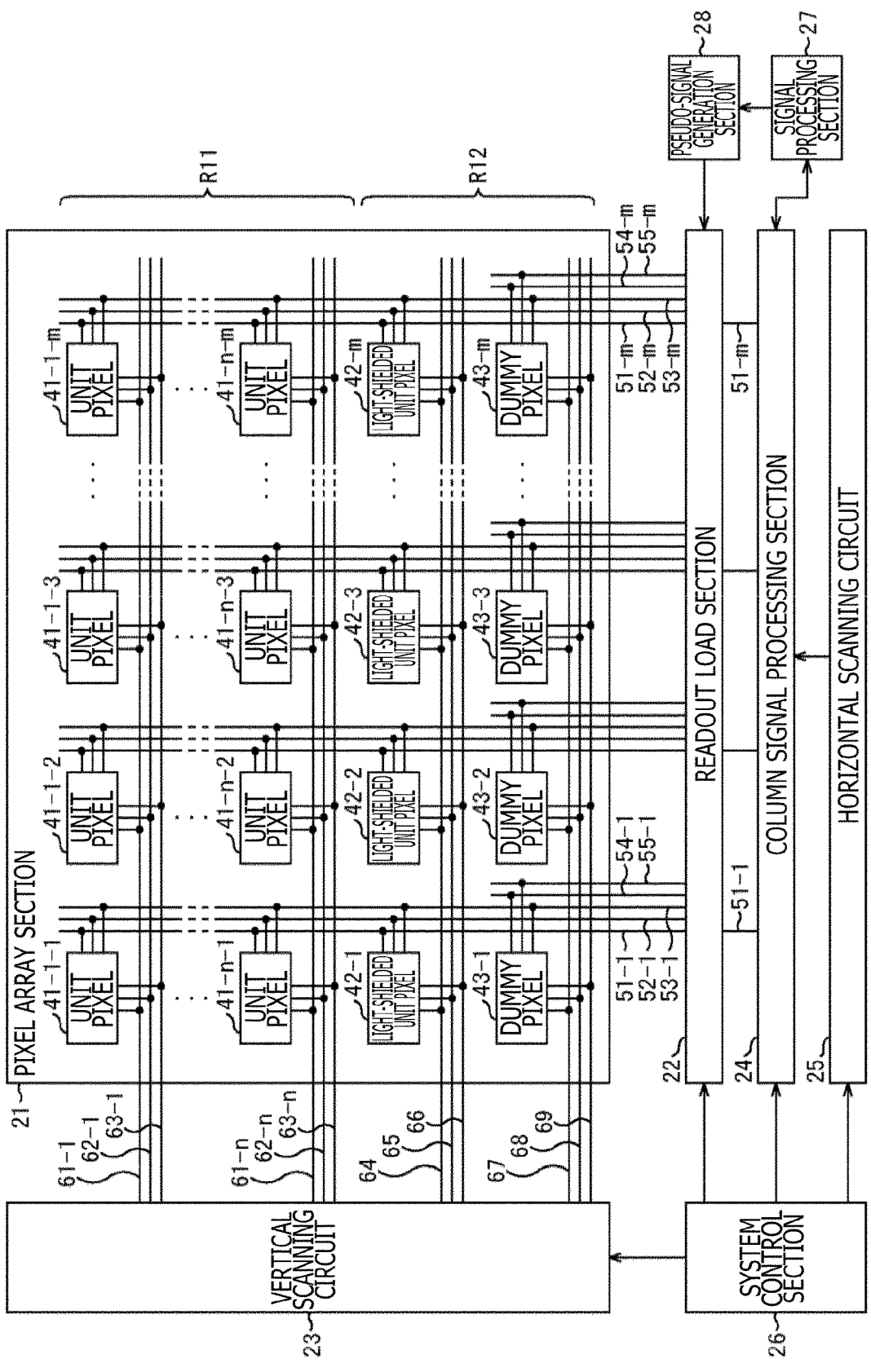
FIG. 1 is a diagram illustrating a configuration example of a solid-state imaging element.

FIG. 1 is a diagram illustrating a configuration example of an embodiment of a solid-state imaging element to which the present technology is applied.

A solid-state imaging element 11 illustrated in FIG. 1 includes a solid-state imaging element such as CMOS image sensor and has a pixel array section 21, a readout load section 22, a vertical scanning circuit 23, a column signal processing section 24, a horizontal scanning circuit 25, a system control section 26, a signal processing section 27, and a pseudo-signal generation section 28.

Although the sections ranging from the pixel array section 21 to the pseudo-signal generation section 28 are formed on a single semiconductor substrate in FIG. 1, some of these sections may be formed on other semiconductor substrate.

A plurality of pixels is arranged in a matrix form in the pixel array section 21. The pixel array section 21 includes a region R11 and a region R12. The region R11 is an effective pixel region where unit pixels are arranged that are primarily used to receive incident light from a subject, convert the light into electric signals, and acquire intended pixel signals. The region R12 is a region outside the effective pixel region.

That is, unit pixels 41-1-1 to 41-$n$-$m$ are arranged in an array form, i.e., in an array in the region R11, the effective pixel region.

In particular, m unit pixels are arranged in a row direction, i.e., horizontally in the drawing, and n unit pixels are arranged in a column direction, i.e., vertically in the drawing.

Specifically, for example, the unit pixels 41-1-1 to 41-1-$m$ are arranged in the first row of the pixel array in the effective pixel region.

Hereinafter, in the case where there is no particular need to distinguish between the unit pixels 41-1-1 to 41-1-$m$, these pixels will be also simply referred to as the unit pixels 41-1. The unit pixels 41-1 are pixels arranged in the first row of the region R11.

Also, for example, the unit pixels 41-$n$-1 to 41-$n$-$m$ are arranged in the nth row of the pixel array in the effective pixel region.

Hereinafter, in the case where there is no particular need to distinguish between the unit pixels 41-$n$-1 to 41-$n$-$m$, these pixels will be also simply referred to as the unit pixels 41-$n$. Also, the unit pixels in the kth row (where $1 \leq k \leq n$) will be hereinafter also simply referred to as the unit pixels 41-$k$, and in the case where there is no particular need to distinguish between the unit pixels in the respective rows, these pixels will be hereinafter also simply referred to as the unit pixels 41.

As described above, the plurality of unit pixels 41 are arranged two-dimensionally in a matrix form, i.e., in an array, in the effective pixel region of the pixel array section 21.

Each of the unit pixels 41 is an effective unit pixel having a photoelectric conversion element capable of converting incident light from a subject into an electric signal, generating photocharge whose amount of charge is proportional to the amount of incident light, accumulating the photocharge therein, and outputting a signal proportional to the photocharge. In this example in particular, the unit pixels 41 are readout pixels from which pixel signals proportional to the amount of externally incident light are to be read out. A photodiode, for example, is provided in each of the unit pixels 41 as the photoelectric conversion element.

Also, light-shielded unit pixels 42-1 to 42-$m$ and dummy pixels 43-1 to 43-$m$ are provided in the region R12 outside the effective pixel region of the pixel array section 21.

For example, although having the same configuration as the unit pixels 41, the light-shielded unit pixels 42-1 to 42-$m$ are VOPB (Vertical Optical Black) pixels in which a light-receiving surface of the photoelectric conversion element is shielded from light. Hereinafter, in the case where there is no particular need to distinguish between the light-shielded unit pixels 42-1 to 42-$m$, these pixels will be also simply referred to as the light-shielded unit pixels 42.

In this example, a row of the light-shielded unit pixels 42 is provided for the pixel array that includes the unit pixels 41. That is, one light-shielded unit pixel 42 is provided for each column of pixels of the pixel array that includes the unit pixels 41. It should be noted that the light-shielded unit pixels 42 may be provided in any quantity as long as one or more light-shielded unit pixels 42 are provided.

Although having the same configuration as the unit pixels 41, the dummy pixels 43-1 to 43-$m$ are light-shielded unit pixels in which the light-receiving surface of the photoelectric conversion element is shielded from light. Hereinafter, in the case where there is no particular need to distinguish between the dummy pixels 43-1 to 43-$m$, these pixels will be also simply referred to as the dummy pixels 43.

In this example, the dummy pixel 43 is included in a differential amplification circuit (differential amplifier), a differential pixel amplifier, together with the unit pixel 41 and functions as a reference pixel which is a positive input ('+' input) side of the differential amplification circuit.

For this reason, a row of the dummy pixels 43 is provided here for the pixel array that includes the unit pixels 41. That is, one dummy pixel 43 is connected to each column of pixels of the pixel array that includes the unit pixels 41. It should be noted that the dummy pixels 43 may be provided in any quantity as long as one dummy pixel 43 is provided for each column of pixels of the pixel array that includes the unit pixels 41.

The light-shielded unit pixels 42 and the dummy pixels 43 have characteristics similar to those of the unit pixels 41. In other words, the light-shielded unit pixels 42 and the dummy pixels 43 have a structure similar to that of the unit pixels 41.

Specifically, the same elements as those included in the unit pixels 41 such as transistors are provided in the light-shielded unit pixels 42 and the dummy pixels 43 in the same layout as in the unit pixels 41.

Therefore, the light-shielded unit pixels 42 and the dummy pixels 43 include the same circuit as the unit pixels 41. As a result, the light-shielded unit pixels 42 and the dummy pixels 43 have similar characteristics to those of the unit pixels 41. In the solid-state imaging element 11 in particular, the light-shielded unit pixels 42 and the dummy pixels 43 differ from the unit pixels 41 only in whether or not the light-receiving surface is shielded from light and are identical in all other respects of the configuration.

It should be noted that although the light-shielded unit pixels 42 and the dummy pixels 43 are provided in the region R12 outside the effective pixel region here, process dummy pixels with no photoelectric conversion element for handling photoelectric conversion may be provided in addition to the above.

Also, hereinafter, the unit pixels will be also simply referred to as the pixels as appropriate, and photocharge whose amount of charge is proportional to the amount of incident light on the unit pixels will be also simply referred to as charge as appropriate.

The readout load section 22 has at least a circuit for supplying a constant current to the selected pixel row of the pixel array section 21 for each pixel column and a current mirror circuit included in the differential amplification circuit.

In the differential amplification circuit, the unit pixel 41 in a selected state, i.e., the selected pixel (readout pixel), is a negative input ('−' input) side of the differential amplification circuit, and the dummy pixel 43, a reference pixel, is a positive input ('+' input) side of the differential amplification circuit, and the difference between the positive input and the negative input is used as an output of the differential amplification circuit.

The readout load section 22 is included in the differential amplification circuit together with the transistor in the selected pixel of the pixel array section 21, and the differential amplification circuit converts a photocharge signal, acquired by the selected pixel, into a voltage signal and outputs the voltage signal to a vertical signal line.

In the example illustrated, for example, in FIG. 1, a vertical signal line is provided for each pixel column. Specifically, the unit pixels 41-1-1 and 41-$n$-1 and the light-shielded unit pixel 42-1 are connected to a vertical signal line 51-1, and the unit pixels 41-1-$m$ and 41-$n$-$m$ and the light-shielded unit pixel 42-$m$ are connected to a vertical signal line 51-$m$.

Hereinafter, in the case where there is no particular need to distinguish between the vertical signal lines 51-1 and 51-$m$, these vertical signal lines will be also simply referred to as the vertical signal lines 51. Here, the dummy pixels 43 are not connected to the vertical signal lines 51.

Also, in the pixel array section 21, the unit pixels 41-1-1 and 41-$n$-1 and the light-shielded unit pixel 42-1 that are included in the same pixel column are connected to a charge discharging signal line 52-1 connected to a given power supply and a signal line 53-1 connected to a tail current source of the differential amplification circuit.

Similarly, the unit pixels 41 and the light-shielded unit pixels 42 in other pixel columns are also connected to signal lines corresponding to the signal line 52-1 and the signal line 53-1. For example, the unit pixels 41-1-$m$ and 41-$n$-$m$ and the light-shielded unit pixel 42-$m$ that are included in the same pixel column are connected to a signal line 52-$m$ connected to a given power supply and a signal line 53-$m$ connected to the tail current source of the differential amplification circuit.

Hereinafter, in the case where there is no particular need to distinguish between the signal lines 52-1 and 52-$m$, these signal lines will be also simply referred to as the signal lines 52, and in the case where there is no particular need to distinguish between the signal lines 53-1 and 53-$m$, these signal lines will be also simply referred to as the signal lines 53.

Further, in the pixel array section 21, the dummy pixel 43-1 in the same pixel column as the unit pixel 41-1-1 is connected to a vertical signal line 54-1 corresponding to the vertical signal line 51, a charge discharging signal line 55-1 corresponding to the signal line 52, and the signal line 53-1 connected to the tail current source.

Similarly, the other dummy pixels 43 are connected to the signal lines corresponding to the signal line 54-1 and the signal line 55-1 and to the signal lines 53. For example, the dummy pixel 43-$m$ in the same pixel column as the unit pixel 41-1-$m$ is connected to a vertical signal line 54-$m$ corresponding to the vertical signal line 51, a charge discharging signal line 55-$m$ corresponding to the signal line 52, and the signal line 53-$m$ connected to the tail current source.

Hereinafter, in the case where there is no particular need to distinguish between the vertical signal lines 54-1 and 54-$m$, these vertical signal lines will be also simply referred to as the vertical signal lines 54, and in the case where there is no particular need to distinguish between the signal lines 55-1 and 55-$m$, these signal lines will be also simply referred to as the signal lines 55.

The vertical signal lines 51, the signal lines 52, and the signal lines 53 described above are provided one each for each of the pixel columns that include the unit pixels 41 and the light-shielded unit pixels 42. Also, the vertical signal lines 54 and the signal lines 55 are provided one each for each of the dummy pixels 43, i.e., for each of the pixel columns.

The vertical scanning circuit 23 includes, for example, shift registers, address decoders, and so on and drives each of the pixels of the pixel array section 21, all pixels at the same time, on a row-by-row basis, or in other manner.

It should be noted that although a specific configuration of the vertical scanning circuit 23 is not depicted, the vertical scanning circuit 23 has a readout scanning system, a sweepout scanning system, or a collective sweepout system, and circuitry for collective transfer.

The vertical scanning circuit 23 is controlled by the system control section 26 and selects and scans the unit pixels 41 of the pixel array section 21 on a row-by-row basis.

In the case of row-by-row driving, i.e., rolling shutter operation, sweepout scanning is performed a shutter speed time ahead of readout scanning on a readout row to be subjected to the readout scanning by the readout scanning system.

Also, in the case of global exposure, i.e., global shutter operation, collective sweepout is performed the shutter speed time ahead of the collective transfer. This sweepout allows unnecessary charge to be swept out from the photoelectric conversion elements of the unit pixels 41 in the readout row (the photoelectric conversion elements to be reset).

Then, sweepout of unnecessary charge (resetting) allows so-called electronic shutter operation to be performed. Here, electronic shutter operation refers to operation that discharges unnecessary photocharge, accumulated in the photoelectric conversion element until immediately prior to electronic shutter operation to initiate exposure anew (initiate the accumulation of photocharge).

A signal readout by the readout operation of the readout scanning system is proportional to the amount of incident light on the unit pixel 41 at the immediately previous readout operation or electronic shutter operation or later.

Further, in the case of row-by-row driving, a time period from the readout timing of the immediately previous readout operation or from the sweepout timing of the electronic shutter operation to the readout timing of the current readout operation is a photocharge accumulation time (exposure time) of the unit pixel 41. In the case of global exposure, the time period from the collective sweepout to the collective transfer is a photocharge accumulation time (exposure time).

Also, here, the vertical scanning circuit 23 is connected to the pixel rows that include the unit pixels 41 by various types of signal lines.

That is, for example, the pixel row that includes the unit pixels 41-1 is connected to a signal line 61-1 for placing the unit pixels 41 into a selected state, a signal line 62-1 for resetting the unit pixels 41, and a signal line 63-1 for transferring charge within the unit pixels 41.

Similarly, signal lines corresponding to the signal line 61-1, the signal line 62-1, and the signal line 63-1 are connected to other pixel rows. For example, the pixel row that includes the unit pixels 41-$n$ is connected to a signal line 61-$n$ for placing the unit pixels 41 into a selected state, a signal line 62-$n$ for resetting the unit pixels 41, and a signal line 63-$n$ for transferring charge within the unit pixels 41.

Hereinafter, in the case where there is no particular need to distinguish between the signal lines 61-1 and 61-$n$, these signal lines will be also simply referred to as the signal lines 61, and in the case where there is no particular need to distinguish between the signal lines 62-1 and 62-$n$, these signal lines will be also simply referred to as the signal lines 62, and in the case where there is no particular need to distinguish between the signal lines 63-1 and 63-$n$, these signal lines will be also simply referred to as the signal lines 63.

These signal lines 61 to 63 are provided one each for each of the pixel rows of the unit pixels 41.

Also, the vertical scanning circuit 23 is connected to the pixel row that includes the light-shielded unit pixels 42 by a signal line 64 corresponding to the signal line 61, a signal line 65 corresponding to the signal line 62, and a signal line 66 corresponding to the signal line 63.

Similarly, the vertical scanning circuit 23 is connected to the pixel row that includes the dummy pixels 43 by a signal line 67 corresponding to the signal line 61, a signal line 68 corresponding to the signal line 62, and a signal line 69 corresponding to the signal line 63.

The column signal processing section 24 is, for example, a single-slope type column AD converter that includes comparators and so on, converting, under control of the system control section 26, signals read out from the unit pixels 41 and the light-shielded unit pixels 42 from analog to digital form, and supplying acquired pixel signals to the signal processing section 27.

The horizontal scanning circuit 25 is a horizontal driving section that includes shift registers, address decoders, and so on and selects, in sequence, unit circuits of the column signal processing section 24 corresponding to the pixel columns. This selective scanning of the horizontal scanning circuit 25 allows pixel signals, processed by the column signal processing section 24, to be output in sequence to the signal processing section 27.

The system control section 26 includes, for example, a timing generator that generates various types of timing signals and so on and controls the driving of the vertical scanning circuit 23, the readout load section 22, the column signal processing section 24, and the horizontal scanning circuit 25 on the basis of the various types of timing signals generated by the timing generator.

The signal processing section 27 performs various types of signal processing tasks such as addition to the pixel signals supplied from the column signal processing section 24. Also, for example, the signal processing section 27 controls the generation of a pseudo-dark current signal by the pseudo-signal generation section 28.

Here, the pseudo-dark current signal is an analog voltage signal or a current signal acquired by artificially generating a dark current component (dark current signal) that occurs in the unit pixel 41. That is, the pseudo-dark current signal is a signal having the same amplitude and in phase with a dark current signal that occurs in the unit pixel 41.

For example, the light-shielded unit pixel 42 is used to detect a dark current signal that occurs in the unit pixel 41. The unit pixel 41 is an aperture pixel whose light-receiving surface, i.e., aperture section, is not shielded from light. Therefore, when the unit pixel 41 is exposed to light, a signal that includes a dark current signal and an imaging signal is acquired. The dark current signal occurs in the unit pixel 41. The imaging signal is acquired by photoelectric conversion of incident light from the subject at the time of exposure.

In contrast, the light-receiving surface of the light-shielded unit pixel 42 is shielded from light. As a result, when the light-shielded unit pixel 42 is exposed to light for only a period of time equal to the unit pixel 41, a signal that includes only a dark current signal and no imaging signal is acquired. Moreover, the light-shielded unit pixel 42 has the same structure as the unit pixel 41, i.e., the same characteristics. Therefore, if the light-shielded unit pixel 42 is exposed to light for the same amount of time and driven in the same manner at the time of exposure as the unit pixel 41, the pixel signal read out from the light-shielded unit pixel 42 is supposedly equivalent to (the same as) the dark current signal that occurs in the unit pixel 41.

For this reason, the signal processing section 27 controls the generation of a pseudo-dark current signal in the pseudo-signal generation section 28 on the basis of the pixel signal acquired by the light-shielded unit pixel 42. The pseudo-dark current signal acquired is input to the dummy pixel 43 that is included in the differential amplification circuit together with the unit pixel 41 as will be described later.

The pseudo-signal generation section 28 receives a dark current signal at the time of readout of the light-shielded unit pixel, i.e., a pixel signal acquired by the light-shielded unit pixel 42, from the signal processing section 27 as a digital signal and generates an analog signal equivalent to the pixel signal, i.e., an analog signal equivalent to the dark current component that occurs in the unit pixel 41, as a pseudo-dark current signal. In other words, the pseudo-signal generation section 28 generates a pseudo-dark current signal on the basis of the pixel signal indicating the dark current signal read out from the light-shielded unit pixel 42.

The pseudo-signal generation section 28 supplies the acquired pseudo-dark current signal to the dummy pixel 43 via the readout load section 22.

That is, in the solid-state imaging element 11, a differential amplification circuit includes the unit pixel 41, the dummy pixel 43, and the readout load section 22, and in the differential amplification circuit, the unit pixel 41 functions as a readout pixel, and the dummy pixel 43 functions as a reference pixel. That is, the dummy pixel 43 is provided on the positive input side of the differential amplification circuit, and the unit pixel 41 is provided on the negative input side of the differential amplification circuit.

Then, the readout load section 22 inputs the pseudo-dark current signal, supplied from the pseudo-signal generation section 28, to the dummy pixel 43, a reference pixel, thus causing the dark current signal occurring in the unit pixel 41 to be cancelled by the pseudo-dark current signal.

<Configuration Example of the Column Signal Processing Section>

Figure 2:
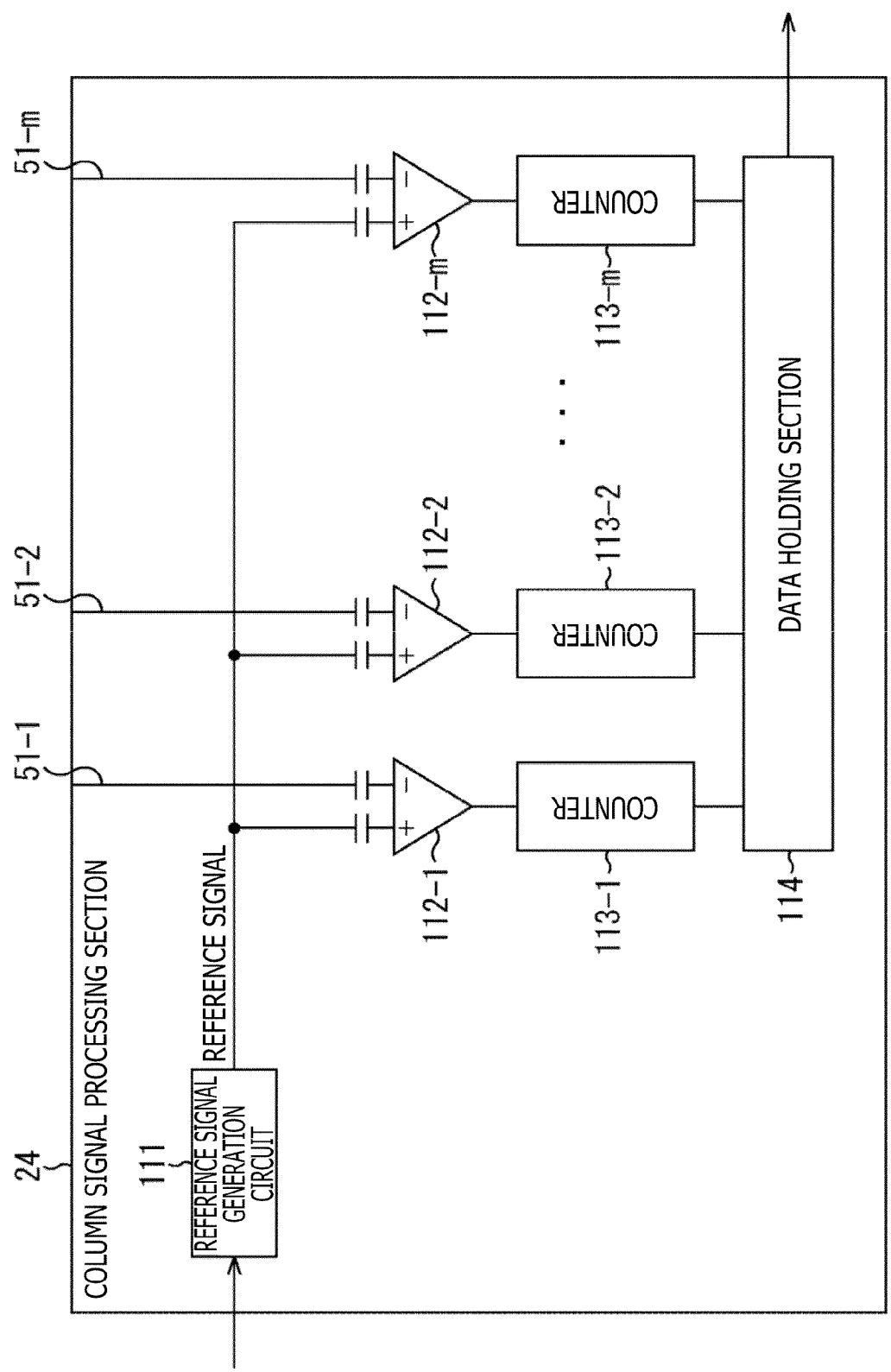
FIG. 2 is a diagram illustrating a configuration example of a column signal processing section.

Also, the column signal processing section 24 illustrated in FIG. 1 is configured, for example, as illustrated in FIG. 2. It should be noted that the portions in FIG. 2 corresponding to those in FIG. 1 are denoted by the same reference symbols and description thereof will be omitted as appropriate.

In the example illustrated in FIG. 2, the column signal processing section 24 is a single-slope type column AD converter. The column signal processing section 24 has a reference signal generation circuit 111, comparators 112-1 to 112-m, counters 113-1 to 113-m, and a data holding section 114.

It should be noted that, hereinafter, in the case where there is no particular need to distinguish between the comparators 112-1 to 112-m, these comparators will be also simply referred to as the comparators 112, and in the case where there is no particular need to distinguish between the counters 113-1 to 113-m, these counters will be also simply referred to as the counters 113.

The reference signal generation circuit 111 generates, as appropriate, a reference signal used for AD conversion to acquire a pixel signal by using a detection result of a dark current signal in the light-shielded unit pixel 42 supplied from the signal processing section 27, supplying the acquired reference signal to an input end of each of the comparators 112.

The reference signal output from the reference signal generation circuit 111 is a signal whose voltage level varies in a time direction. In other words, the voltage level indicated by the reference signal (hereinafter also referred to as a reference voltage) varies with time.

In the column signal processing section 24, the comparator 112 and the counter 113 are provided for each of the pixel columns of the pixel array section 21 that includes the plurality of unit pixels 41.

That is, for example, the comparator 112-1 has one of its input ends connected to the reference signal generation circuit 111 via a capacitive element and the other input end connected to the unit pixel 41-1-1, the unit pixel 41-n-1, and the light-shielded unit pixel 42-1 via a capacitive element and the vertical signal line 51-1.

Similarly, for example, the comparator 112-2 has one of its input ends connected to the reference signal generation circuit 111 via a capacitive element and the other input end connected to the unit pixel 41-1-2, the unit pixel 41-n-2, and the light-shielded unit pixel 42-2 via a capacitive element and the vertical signal line 51-2. Further, the comparator 112-m has one of its input ends connected to the reference signal generation circuit 111 via a capacitive element and the other input end connected to the unit pixel 41-1-m, the unit pixel 41-n-m, and the light-shielded unit pixel 42-m via a capacitive element and the vertical signal line 51-m.

Each of the capacitive elements connected to the respective input ends of each of the comparators 112 is intended to achieve analog CDS (Correlated Double Sampling) for cancelling analog variation between individual elements, i.e., auto zero operation.

The comparator 112 compares the reference signal supplied from the reference signal generation circuit 111 with the signal output from the unit pixel 41 or the light-shielded unit pixel 42 via the vertical signal line 51 and supplies a signal indicating a comparison result thereof to the counter 113. The signal output from the comparator 112 is inverted when a relationship in magnitude between the reference signal and the signal output from the unit pixel 41 or the light-shielded unit pixel 42 is reversed.

The counters 113-1 to 113-m count the times it takes until the signals output from the comparators 112-1 to 112-m are inverted, respectively, and supply count data (count value) acquired as a result thereof to the data holding section 114 as a pixel signal acquired by the unit pixel 41 or the light-shielded unit pixel 42.

Thanks to the operation of the comparators 112 and the counters 113, the pixel signals read out from the unit pixels 41 and the light-shielded unit pixels 42 are converted from analog to digital form.

The data holding section 114 holds the pixel signals of the unit pixels 41 and the light-shielded unit pixels 42 supplied from the respective counters 113 and supplies the held pixel signals, digital signals, in sequence to the signal processing section 27.

It should be noted that the column signal processing section 24 performs, for example, a noise removal process such as CDS process (correlated double sampling process) as signal processing performed on the signals acquired by the unit pixels 41 and the light-shielded unit pixels 42.

Thanks to the CDS process performed by the column signal processing section 24, pixel-specific fixed pattern noise such as reset noise and variation in amplifying transistor threshold that occurs in the unit pixels 41 and the light-shielded unit pixels 42 is removed.

It should be noted that the column signal processing section 24 can be equipped not only with the noise removal process but also, for example, with an AD conversion function (analog/digital conversion function) so that a signal level is output in digital form. Here, AD conversion is accomplished by the comparators 112 and the counters 113.

<Configuration Example of the Unit Pixel>

Further, a description will be given of a basic function of each of the unit pixels 41 illustrated in FIG. 1.

Figure 3:
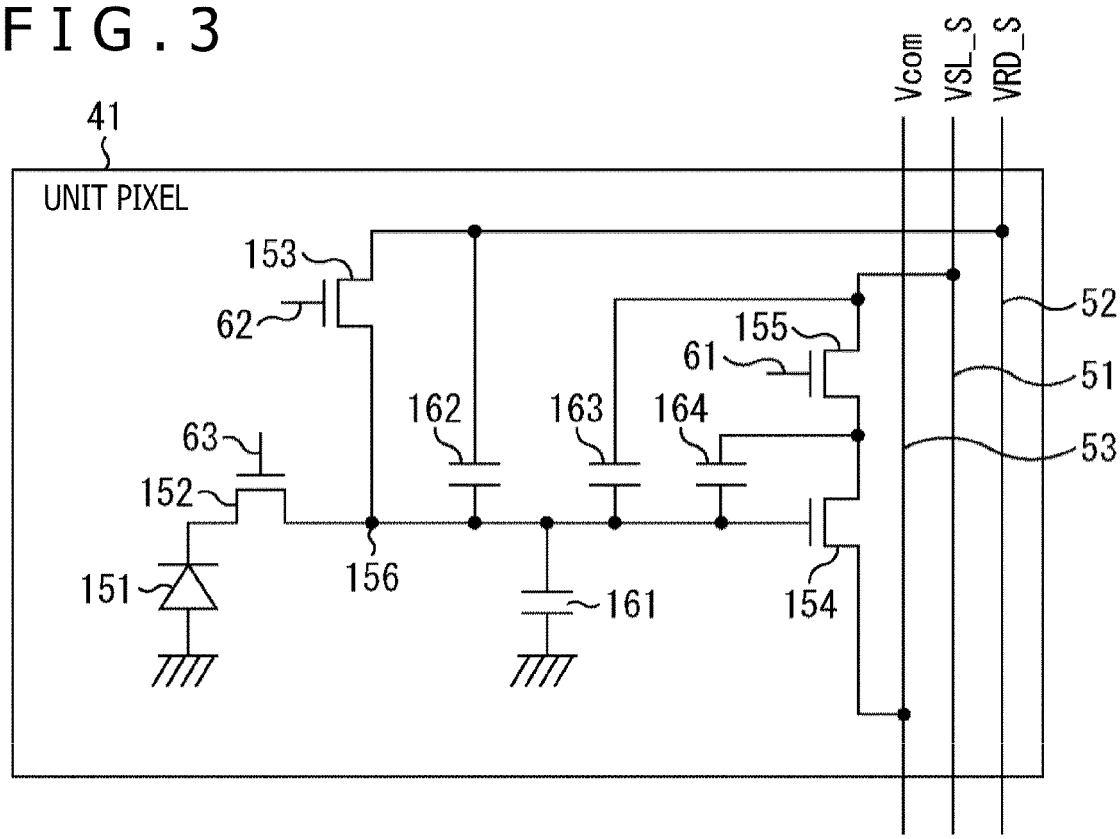
FIG. 3 is a diagram illustrating a configuration example of a unit pixel.

The unit pixel 41 is configured, for example, as illustrated in FIG. 3. It should be noted that the portions in FIG. 3 corresponding to those in FIG. 1 are denoted by the same reference symbols and description thereof will be omitted as appropriate.

The unit pixel 41 illustrated in FIG. 3 has a photodiode 151 (PD), a transfer transistor 152, a reset transistor 153, an amplifying transistor 154, a select transistor 155, and a floating diffusion section 156.

Here, each of the transfer transistor 152, the reset transistor 153, the amplifying transistor 154, and the select transistor 155 is an nMOS transistor.

Also, a capacitance 161, a capacitance 162, a capacitance 163, and a capacitance 164 connected to the floating diffusion section 156, a floating diffusion region, i.e., a floating diffusion node, are all parasitic capacitances that are significantly smaller than the capacitance of the floating diffusion section 156. However, a capacitive element may be intentionally connected to the floating diffusion section 156 to adjust the conversion efficiency of charge into a voltage signal.

It should be noted that the floating diffusion section 156 will be hereinafter also denoted as the FD section 156. Also, the photodiode 151 will be hereinafter also denoted as the PD 151.

The PD 151 is a photoelectric conversion element that generates charge proportional to the amount of incident light by converting external incident light into an electric signal.

The transfer transistor 152 is provided between the PD 151 and the FD section 156 and transfers charge acquired by the photoelectric conversion by the PD 151 and accumulated in the PD 151 to the FD section 156.

Here, the transfer transistor 152 has its gate connected to the signal line 63, thus causing the transfer transistor 152 to be driven in response to a drive signal TRG_S, a signal pulse supplied from the vertical scanning circuit 23 via the signal line 63.

Specifically, when the drive signal TRG_S turns ON, that is, when the drive signal is pulled up to high level that is higher in voltage than the drive signal TRG_S, the transfer transistor 152 transfers the charge accumulated in the PD 151 to the FD section 156.

The reset transistor 153 is provided between a given power supply and the FD section 156 and has its gate connected to the signal line 62. In particular, here, the reset transistor 153 has its drain connected to a given power supply via the signal line 52 denoted by characters 'VRD_S.' It should be noted that the reset transistor 153 may have its source connected to the signal line 52.

The reset transistor 153 is driven in response to a drive signal RST_S, a signal pulse supplied from the vertical scanning circuit 23 via the signal line 62.

Specifically, the reset transistor 153 performs reset operation, for example, before or after signal readout from the unit pixel 41 when the drive signal RST_S is turned ON, that is, when the drive signal RST_S is pulled up to high level, a higher voltage level. That is, the reset transistor 153 resets the FD section 156 and the PD 151 by discharging the charge accumulated in the FD section 156 and the PD 151 to a given power supply via the signal line 52.

The amplifying transistor 154 has its drain connected to the source of the select transistor 155 and its source connected to the signal line 53 denoted by characters 'Vcom.' It should be noted that the amplifying transistor 154 may have its drain connected to the signal line 53.

Also, the amplifying transistor 154 has its gate connected to the FD section 156. The amplifying transistor 154 functions as an amplifier that receives, as an input signal, a voltage variation of the FD section 156 connected to its own gate, and an output voltage signal output from the amplifying transistor 154 is output to the vertical signal line 51 denoted by characters 'VSL_S' via the select transistor 155.

As described above, the output voltage signal output from the amplifying transistor 154 is supplied to the input end of the comparator 112 via the select transistor 155 and the vertical signal line 51.

Also, the signal line 53 connected to the amplifying transistor 154 is an in-phase node of a differential pair to which a tail voltage source is connected during signal readout from the unit pixel 41 in the differential amplification circuit that includes the single unit pixel 41, the single dummy pixel 43, and the readout load section 22.

The select transistor 155 has its drain connected to the input end of the comparator 112 via the vertical signal line 51 and its source connected to the drain of the amplifying transistor 154. It should be noted that the select transistor 155 may have its source connected to the vertical signal line 51.

Also, the select transistor 155 is driven in response to a drive signal SEL_S, a signal pulse supplied from the vertical scanning circuit 23 via the signal line 61.

Specifically, the select transistor 155 electrically connects the vertical signal line 51 to the amplifying transistor 154 when the drive signal SEL_S turns ON, that is, when the drive signal SEL_S is pulled up to high level, a higher voltage level during signal readout from the unit pixel 41, thus placing the unit pixel 41 in which the select transistor 155 itself is provided into a selected state. When the unit pixel 41 is placed into a selected state, the output voltage signal output from the amplifying transistor 154 is output to the vertical signal line 51 via the select transistor 155.

In the unit pixel 41 configured as described above, the reset transistor 153 that discharges the charge accumulated in the PD 151 and the FD section 156 turns ON and OFF the discharge of charge accumulated in the PD 151 and the FD section 156 in accordance with the drive signal RST_S supplied from the vertical scanning circuit 23.

For example, when the high-level drive signal RST_S is supplied, the reset transistor 153 discharges the charge accumulated in the FD section 156 through the signal line 52. That is, the FD section 156 is reset.

In contrast, for example, when the low-level drive signal RST_S lower in voltage level than high level is supplied, the reset transistor 153 electrically isolates the FD section 156 from the signal line 52. This places the FD section 156 into a floating state.

On the other hand, the PD 151 converts external incident light into an electric signal, generating charge proportional to the amount of incident light and accumulating the charge.

The transfer transistor 152 turns ON and OFF the transfer of charge from the PD 151 to the FD section 156 in accordance with the drive signal TRG_S supplied from the vertical scanning circuit 23.

For example, when the high-level drive signal TRG_S is supplied, the transfer transistor 152 transfers the charge accumulated in the PD 151 to the FD section 156, and when the low-level drive signal TRG_S is supplied, the transfer transistor 152 halts the transfer of charge to the FD section 156.

It should be noted that while the transfer transistor 152 halts the transfer of charge to the FD section 156, charge acquired by the photoelectric conversion is accumulated in the PD 151.

The FD section 156, a floating diffusion region, has a function to accumulate charge transferred from the PD 151 via the transfer transistor 152.

When the FD section 156 is in a floating state after the reset transistor 153 has been turned OFF, a potential of the FD section 156 is modulated in accordance with the amount of charge accumulated in the FD section 156.

The select transistor 155 turns ON and OFF the output of the output voltage signal from the amplifying transistor 154 to the vertical signal line 51 in accordance with the drive signal SEL_S supplied from the vertical scanning circuit 23.

For example, when the high-level drive signal SEL_S is supplied, the select transistor 155 outputs the output voltage signal to the vertical signal line 51, and when the low-level drive signal SEL_S is supplied, the select transistor 155 halts the output of the output voltage signal to the vertical signal line 51.

This makes it possible to extract (read out) only the output voltage signal output from the unit pixel 41 in a selected state in the vertical signal line 51 to which the plurality of unit pixels 41 are connected.

It should be noted that the pixel configuration of the unit pixel 41 is not limited to that illustrated in FIG. 3 and that the unit pixel 41 may have any pixel configuration including that with a memory capable of global shutter operation and that with a shared floating diffusion. That is, the present technology is applicable to a variety of pixel configurations.

<Configuration Examples of the Readout Load Section and the Pseudo-Signal Generation Section>

A description will be given next of configuration examples of the readout load section 22 and the pseudo-signal generation section 28 illustrated in FIG. 1.

Figure 4:
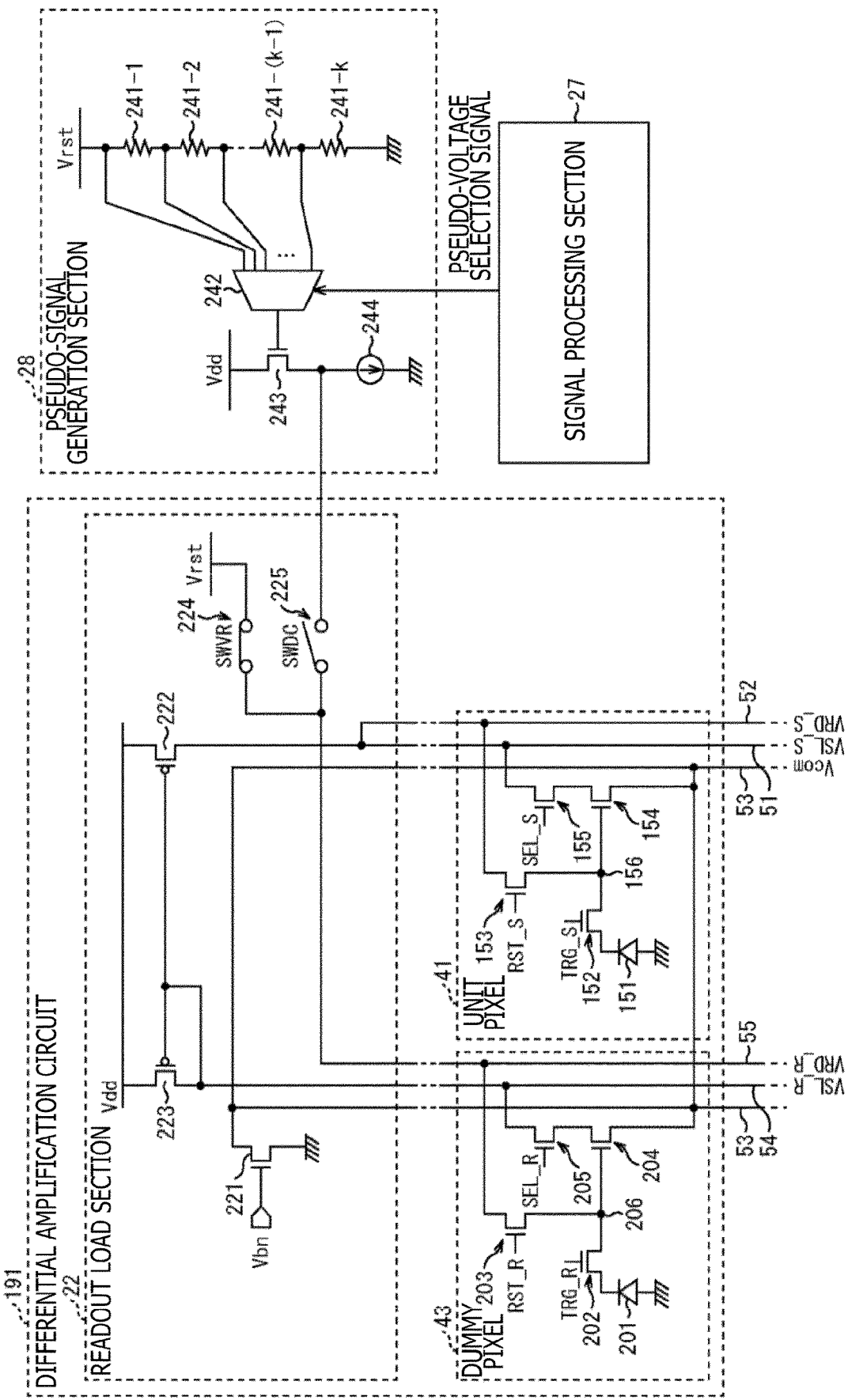
FIG. 4 is a diagram illustrating examples of a readout load section and a pseudo-signal generation section.

The readout load section 22 and the pseudo-signal generation section 28 are configured, for example, as illustrated in FIG. 4. It should be noted that the portions in FIG. 4 corresponding to those in FIG. 1 or 3 are denoted by the same reference symbols and description thereof will be omitted as appropriate.

In the examples illustrated in FIG. 4, the unit pixel 41 and the dummy pixel 43 are paired as a differential pair, and a differential amplification circuit 191, a differential amplifier, includes the unit pixel 41, the dummy pixel 43, and the readout load section 22.

In particular, here, the dummy pixel 43 is the reference side of the differential pair, i.e., the positive input side, and the unit pixel 41 is the signal readout side of the differential pair, i.e., the negative input side.

In addition to the fact that the dummy pixel 43 includes the same components as the unit pixel 41, the light-receiving surface of the dummy pixel 43 is shielded from light.

That is, the dummy pixel 43 has a photodiode 201, a transfer transistor 202, a reset transistor 203, an amplifying transistor 204, a select transistor 205, and a floating diffusion section 206.

The photodiode 201 to the floating diffusion section 206 correspond, respectively, to the PD 151 to the FD section 156 of the unit pixel 41 and are laid out with the same connection relationship as the PD 151 to the FD section 156. It should be noted that the photodiode 201 will be also referred to as the PD 201 and that the floating diffusion section 206 will be also referred to as the FD section 206.

In the dummy pixel 43, the PD 201 to the FD section 206 operate in a similar manner to the PD151 to FD section 156 of the unit pixel 41. In the dummy pixel 43, however, the light-receiving surface is shielded from light, thus preventing external light from entering the PD 201.

The select transistor 205 has its gate connected to the signal line 67, thus causing the select transistor 205 to be driven in response to a drive signal SEL_R supplied from the vertical scanning circuit 23 via the signal line 67. Here, the drive signal SEL_R corresponds to the drive signal SEL_S.

Similarly, the reset transistor 203 has its gate connected to the signal line 68, thus causing the reset transistor 203 to be driven in response to a drive signal RST_R supplied from the vertical scanning circuit 23 via the signal line 68. Here, the drive signal RST_R corresponds to the drive signal RST_S.

The transfer transistor 202 has its gate connected to the signal line 69, thus causing the transfer transistor 202 to be driven in response to a drive signal TRG_R supplied from the vertical scanning circuit 23 via the signal line 69. Here, the drive signal TRG_R corresponds to the drive signal TRG_S.

Further, in the dummy pixel 43, the amplifying transistor 204 has its source connected to the signal line 53, and the select transistor 205 has its drain connected to the vertical signal line 54 denoted by characters 'VSL_R.' Also, the reset transistor 203 has its drain connected to the signal line 55 denoted by characters 'VRD_R.'

It should be noted that the amplifying transistor 204 may have its drain connected to the signal line 53, that the select transistor 205 may have its source connected to the vertical signal line 54, and that the reset transistor 203 may have its source connected to the signal line 55.

Also, the readout load section 22 included in the differential amplification circuit 191 has a current source transistor 221, a load transistor 222, and a load transistor 223. The current source transistor 221 is a tail current source of the differential pair. The load transistor 222 is an output load of the differential pair. The load transistor 223 is a destination referenced by a current mirror circuit that copies a given current to the load transistor 222.

Here, the load transistor 222 and the load transistor 223 each include a pMOS transistor, and the current mirror circuit includes the load transistor 222 and the load transistor 223.

Further, the readout load section 22 has a switch 224 for supplying a reset power supply and a switch 225 for supplying a pseudo-dark current signal.

The switch 224 turns ON and OFF in response to a drive signal SWVR supplied from an external source such as the vertical scanning circuit 23, and the switch 225 turns ON and OFF in response to a drive signal SWDC supplied from an external source such as the vertical scanning circuit 23.

Here, the switch 224 is OFF when the drive signal SWVR is at low level and turns ON when the drive signal SWVR is pulled up to high level. The switch 224 has its one end connected to a reset power supply of a reset voltage Vrst and its other end connected to the signal line 55.

Also, the switch 225 is OFF when the drive signal SWDC is at low level and turns ON when the drive signal SWDC is pulled up to high level.

In the example illustrated in FIG. 4, the signal line 55 is a signal line for discharging the charge accumulated in the FD section 206 of the dummy pixel 43, and the switch 224 and the switch 225 are connected to the signal line 55.

The current source transistor 221 includes an nMOS transistor and is controlled by a given bias voltage Vbn to pass a constant current to the unit pixel 41 and the dummy pixel 43, a differential pair.

Here, a node corresponding to the drain of the current source transistor 221 is electrically connected to the source of the amplifying transistor 154 of the unit pixel 41 and the source of the amplifying transistor 204 of the dummy pixel 43 by the signal line 53 as in-pixel wiring.

The load transistor 222 has its drain electrically connected to the drain of the select transistor 155 of the unit pixel 41 via the vertical signal line 51, in-pixel wiring, and its source connected to a power supply at a given voltage Vdd.

Also, the load transistor 223 has its drain electrically connected to the drain of the select transistor 205 of the dummy pixel 43 via the vertical signal line 54, in-pixel wiring, and its source connected to the power supply at the given voltage Vdd.

Further, the load transistor 223 has its gate connected to the gate of the load transistor 222 and the drain of the load transistor 223, thus allowing the load transistor 223 and the load transistor 222 to form a current mirror circuit.

Also, the signal line 55 is electrically connected to the drain of the reset transistor 203 of the dummy pixel 43, and the signal line 52 is electrically connected to the drain of the reset transistor 153 of the unit pixel 41.

Further, in the differential amplification circuit 191, the FD section 206 of the dummy pixel 43 is the positive input side (input node) of the differential amplification circuit 191, and the FD section 156 of the unit pixel 41 is the negative input side (input node) of the differential amplification circuit 191. That is, the signal accumulated in the FD section 206 is a positive input, and the signal accumulated in the FD section 156 is a negative input. Then, the potential of the vertical signal line 51 is an output of the differential amplification circuit 191.

Also, in the example illustrated in FIG. 4, the vertical signal line 51 is electrically connected to the signal line 52, thus shorting the input and output of the differential amplification circuit 191 at the time of reset of the FD section 156 and applying a negative feedback. As a result, it is possible to provide an operating point for stable operation of the differential amplification circuit 191.

The differential amplification circuits 191, each including the readout load section 22, the unit pixel 41, and the dummy pixel 43 as described above are provided, for example, in the same quantity as the number of pixel columns (number of columns) provided in the pixel array section 21, that is, one differential amplification circuit 191 is provided in parallel for each pixel column.

Also, a pseudo-dark current signal, an analog signal supplied to the reference pixel, i.e., the dummy pixel 43, as a positive input of the differential amplification circuits 191, is generated by the pseudo-signal generation section 28 and supplied to the FD section 206 of the dummy pixel 43 via a switch 255.

For example, the pseudo-signal generation section 28 is a DA conversion circuit that generates a given voltage signal with ladder resistors as a pseudo-dark current signal.

In FIG. 4, the pseudo-signal generation section 28 has k resistors 241-1 to 241-$k$, a selector 242, an amplifying transistor 243, and a current source element 244. The resistors 241-1 to 241-$k$ are included in the ladder resistors and are connected in series to each other.

It should be noted that, hereinafter, in the case where there is no particular need to distinguish between the resistors 241-1 to 241-$k$, these resistors will be also simply referred to as the resistors 241.

In the pseudo-signal generation section 28, the amplifying transistor 243 has its one end connected to the power supply at the given voltage Vdd and its other end connected to the switch 225 and the current source element 244.

Also, the end of the current source element 244 on the opposite side of the amplifying transistor 243 is connected to ground. Further, the amplifying transistor 243 has its gate connected to an output terminal of the selector 242.

As described above, in the pseudo-signal generation section 28, a source follower circuit includes the amplifying transistor 243, the current source element 244, and other components.

The selector 242 has its input ends connected to the respective resistors 241, and k voltage signals acquired by division with the k resistors 241 are input to the selector 242. It can be said that these voltage signals input to the selector 242 are possible options as a pseudo-dark current signal.

Also, a pseudo-voltage selection signal is supplied to the selector 242 from the signal processing section 27. This pseudo-voltage selection signal is generated by the signal processing section 27 on the basis of a pixel signal indicating the dark current component that occurred in and that was read out from the light-shielded unit pixel 42.

The selector 242 selects at least one of the voltage signals from among the k voltage signals, analog signals, input from the ladder resistors that include the resistors 241 on the basis of the pseudo-voltage selection signal supplied from the signal processing section 27, supplying the voltage signal to the gate of the amplifying transistor 243, the input of the source follower circuit.

Then, the amplifying transistor 243 supplies, to the dummy pixel 43, an analog signal proportional to the voltage signal supplied to its own gate, via the switch 225 and the signal line 55 as a pseudo-dark current signal. In other words, as the switch 255 turns ON, this switch supplies the pseudo-dark current signal to the dummy pixel 43, the reference side of the differential pair.

The pseudo-dark current signal output from the amplifying transistor 243 is supplied to the dummy pixels 43 of the m respective pixel columns of the pixel array section 21. The source follower circuit that includes the amplifying transistor 243 and the current source element 244 functions as a buffer for supplying the pseudo-dark current signal to each of the dummy pixels 43.

The light-shielded unit pixel 42 has similar characteristics to the unit pixel 41 and has its light-receiving surface shielded from light. Therefore, the pseudo-dark current signal that occurs in the light-shielded unit pixel 42 is equivalent to the pseudo-dark current signal that occurs in the unit pixel 41.

For this reason, if the signal processing section 27 generates a pseudo-voltage selection signal on the basis of a pixel signal read out from the light-shielded unit pixel 42, and if the selector 242 selects an appropriate voltage signal from among the plurality of input voltage signals and outputs the selected signal, it is possible to input a pseudo-dark current signal equivalent to the dark current signal that occurs in the unit pixel 41 to the dummy pixel 43.

In other words, the pseudo-signal generation section 28 functions as a DA conversion circuit that converts a digital dark current component of the light-shielded unit pixel 42, acquired by the signal processing section 27, into an analog pseudo-dark current signal and outputs the pseudo-dark current signal.

<Operation of the Solid-State Imaging Element>

A description will be given next of the operation of the solid-state imaging element 11.

That is, a description will be given below of a basic driving example for reading out pixel signals from the unit pixel 41 by using the differential amplification circuit 191 with reference to FIGS. 5 to 8.

Figure 5:
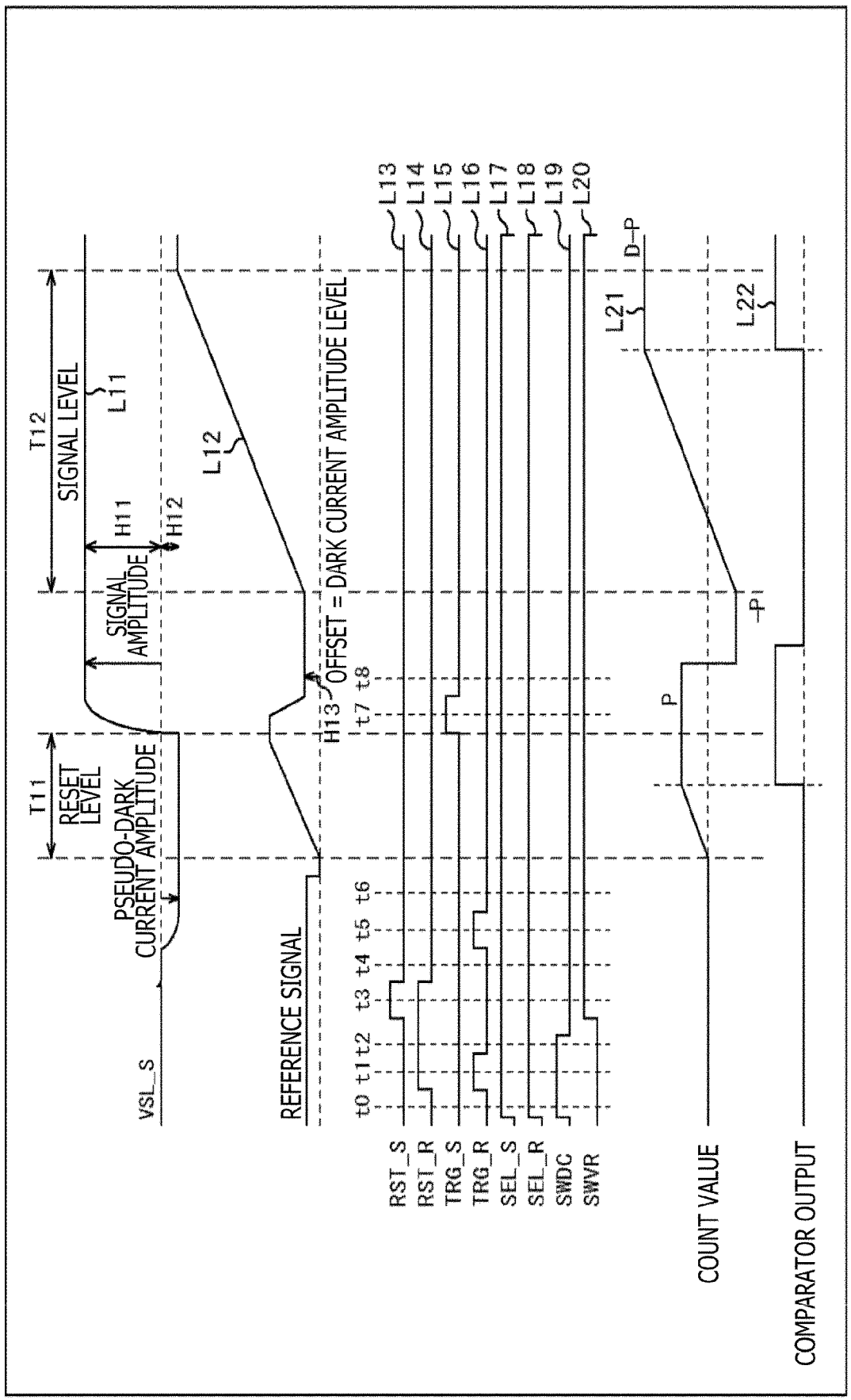
FIG. 5 is a diagram describing an example of driving the solid-state imaging element.
Figure 6:
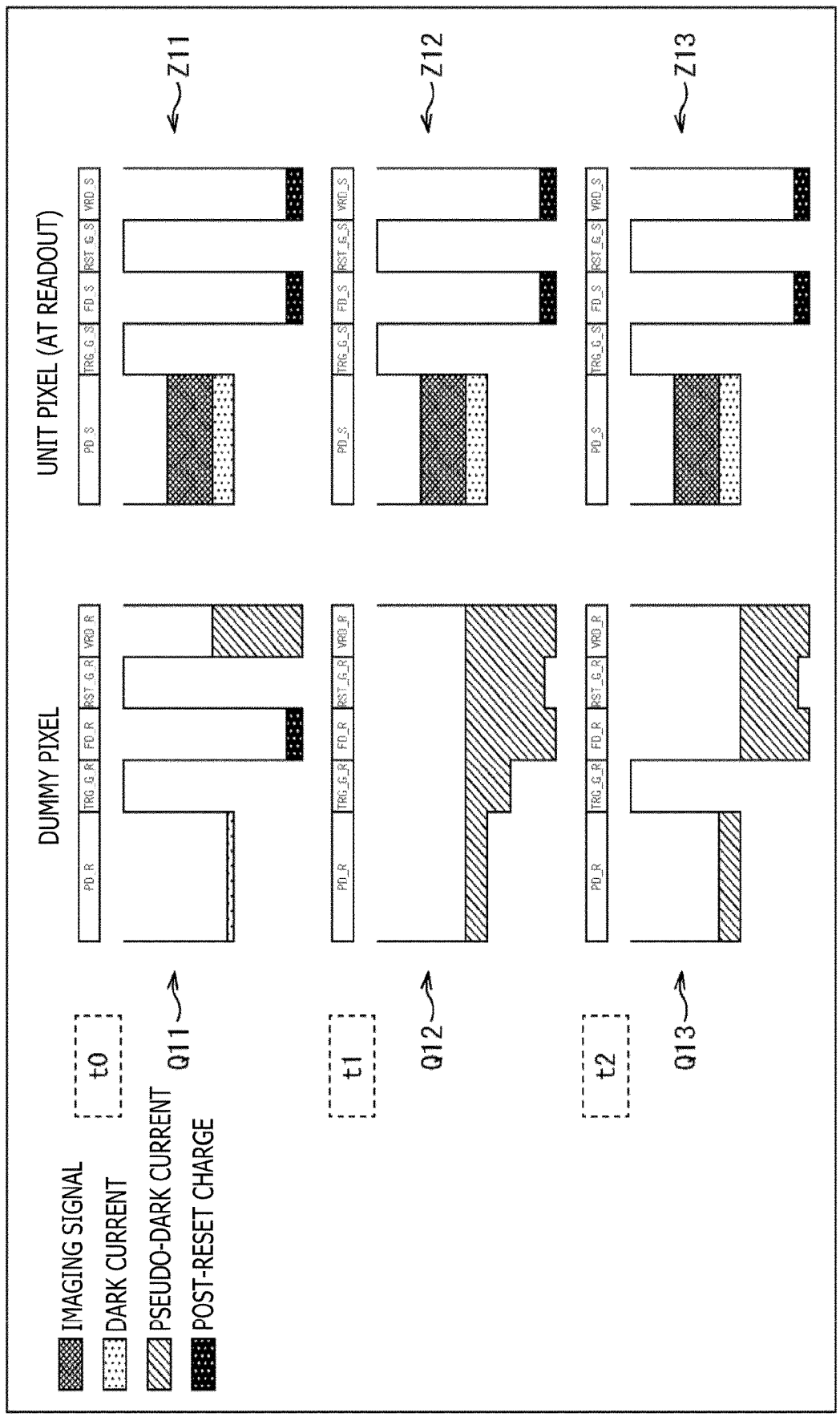
FIG. 6 is a diagram illustrating transitions undergone by charge in a dummy pixel and the unit pixel.
Figure 7:
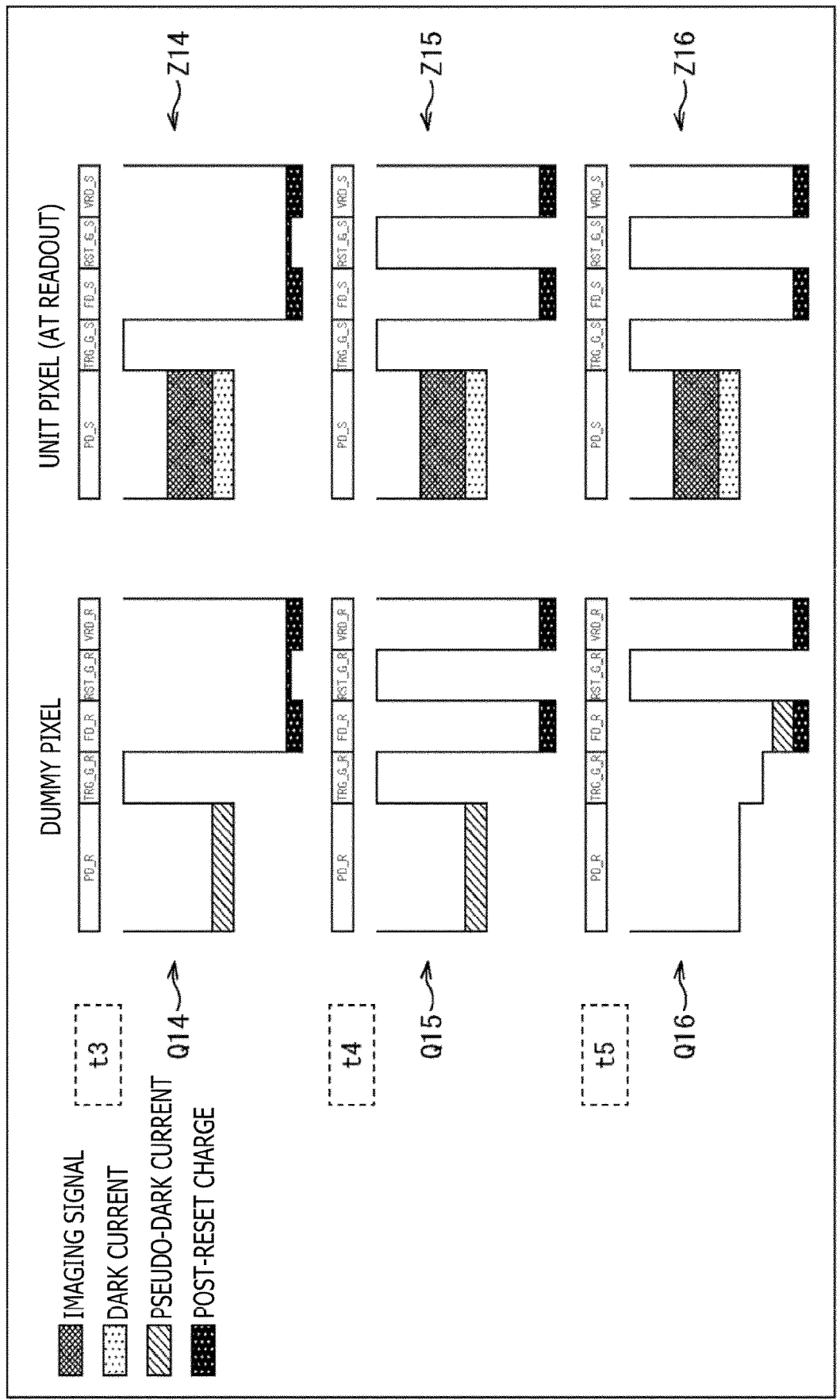
FIG. 7 is another diagram illustrating transitions undergone by charge in the dummy pixel and the unit pixel.
Figure 8:
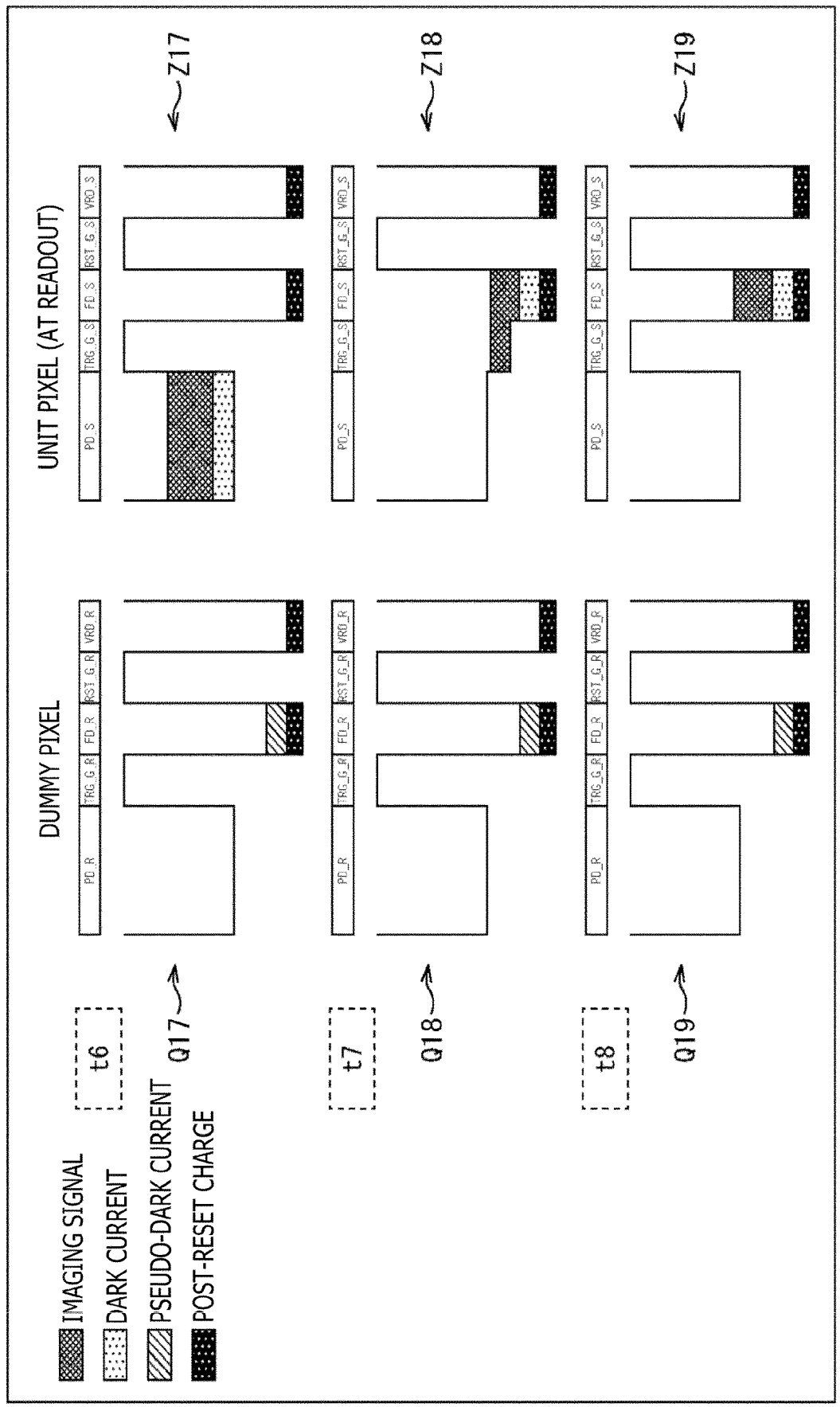
FIG. 8 is further another diagram illustrating transitions undergone by charge in the dummy pixel and the unit pixel.

FIG. 5 illustrates a timing diagram indicating operation timings of the respective sections of the solid-state imaging element 11, and FIGS. 6 to 8 illustrate transitions undergone by charge in each section of the unit pixel 41 and the dummy pixel 43 at each time, i.e., at each timing.

It should be noted that a horizontal direction in FIG. 5 indicates time. Also, a curve L11 in FIG. 5 indicates a level (voltage) of the vertical signal line 51 at each time, and a polyline L12 indicates a level of the reference signal (reference voltage) output from the reference signal generation circuit 111 at each time.

In FIG. 5, polylines L13 to L20 indicate levels (waveforms) of the drive signal RST_S, the drive signal RST_R, the drive signal TRG_S, the drive signal TRG_R, the drive signal SEL_S, the drive signal SEL_R, the drive signal SWDC, and the drive signal SWVR, respectively.

Here, when each of the drive signal RST_S to the drive signal SWVR is upwardly projected, this indicates that the drive signal is at high level, and when each of the drive signal RST_S to the drive signal SWVR is downwardly projected, this indicates that the drive signal is at low level.

Further, in FIG. 5, a polyline L21 indicates a count value of the counter 113 at each time, and a polyline L22 indicates an output signal of the comparator 112 at each time.

Also, in FIGS. 6 to 8, characters 'PD_R,' 'TRG_G_R,' 'FD_R,' 'RST_G_R,' and 'VRD_R' indicate potentials (levels) of the PD 201, the transfer transistor 202, the FD section 206, the reset transistor 203, and the signal line 55 of the dummy pixel 43, respectively.

Similarly, in FIGS. 6 to 8, characters 'PD_S,' 'TRG_G_S,' 'FD_S,' 'RST_G_S,' and 'VRD_S' indicate potentials (levels) of the PD 151, the transfer transistor 152, the FD section 156, the reset transistor 153, and the signal line 52 of the unit pixel 41, respectively.

For example, as illustrated in FIG. 5, the drive signal RST_S, the drive signal RST_R, the drive signal TRG_S, and the drive signal TRG_R are at low level, and the drive signal SEL_S and the drive signal SEL_R are at high level at time t0. Also, the drive signal SWDC is at high level, and the drive signal SWVR is at low level.

Therefore, in the dummy pixel 43 as indicated by an arrow Q11 in FIG. 6, the transfer transistor 202 turns OFF in response to the drive signal TRG_R, electrically isolating the PD 201 from the FD section 206. Also, the reset transistor 203 turns OFF in response to the drive signal RST_R, electrically isolating the FD section 206 from the signal line 55.

Further, the drive signal SWDC is at high level, and the drive signal SWVR is at low level. Therefore, the switch 225 is ON, and the switch 224 is OFF, electrically connecting the signal line 55 to the amplifying transistor 243 via the switch 225. For this reason, the potential (level) of the signal line 55 is equal to the level of the pseudo-dark current signal.

Similarly, in the unit pixel 41 as indicated by an arrow Z11, the transfer transistor 152 turns OFF in response to the drive signal TRG_S, electrically isolating the PD 151 from the FD section 156. Also, the reset transistor 153 turns OFF in response to the drive signal RST_S, electrically isolating the FD section 156 from the signal line 52.

In this state in particular, external incident light is converted into an electric signal in the PD 151, and the charge acquired as a result, i.e., an imaging signal, and the charge of the dark current signal that occurs in the unit pixel 41, are accumulated in the PD 151. The accumulation of the imaging signal charge takes place continuously throughout the period of exposure.

At time t0 illustrated in FIG. 5, when the drive signal SEL_S and the drive signal SEL_R are switched from low to high level in such a state, the select transistor 155 of the unit pixel 41 and the select transistor 205 of the dummy pixel 43 turn ON, respectively.

Then, the unit pixel 41 is placed into a selected state, causing a current to be supplied to the drain of the amplifying transistor 154 from the source of the amplifying transistor 154, i.e., from the current source transistor 221. Similarly, the dummy pixel 43 is placed into a selected state, causing a current to be supplied to the drain of the amplifying transistor 204 from the source of the amplifying transistor 204, i.e., from the current source transistor 221.

Then, the differential amplification circuit 191 is activated by the respective potentials of the FD section 156 and the FD section 206, respective floating diffusion regions of the unit pixel 41 and the dummy pixel 43 in a selected state, thus causing an amplified output voltage signal to be output to the vertical signal line 51.

As indicated by the arrow Z11 in FIG. 6, an imaging signal and a dark current signal proportional to imaging for a given accumulation time (exposure time) are accumulated in the PD 151 in the unit pixel 41 at the time of pixel signal readout. Also, as indicated by the arrow Q11 in FIG. 6, the PD 201 is shielded from light in the dummy pixel 43. Therefore, no imaging signal is accumulated. As a result, an extremely minute dark current signal, whose accumulation starts from after the readout of the immediately previous pixel signal, is accumulated in the PD 201.

Thereafter, at time t1, as illustrated in FIG. 5, the drive signal RST_R and the drive signal TRG_R, supplied from the vertical scanning circuit 23, are pulled up to high level. The drive signal SWDC is also kept at high level, that is, the switch 225 is kept ON.

For this reason, as indicated by an arrow Q12 in FIG. 6, the transfer transistor 202 turns ON in response to the drive signal TRG_R, electrically connecting the PD 201 to the FD section 206. Also, the reset transistor 203 turns ON in response to the drive signal RST_R, electrically connecting the FD section 206 to the signal line 55.

This causes the pseudo-dark current signal, generated by the pseudo-signal generation section 28, to be supplied to the PD 201 from the amplifying transistor 243 via the switch 225 and the signal line 55. That is, the potential of the connected PD 201 and the FD section 206 that are electrically connected is set equal to the level of the pseudo-dark current signal.

At this time, as indicated by an arrow Z12, the unit pixel 41 is in the same state as indicated by the arrow Z11.

In the solid-state imaging element 11, a process of reading out a pixel signal from the light-shielded unit pixel 42, i.e., a process of detecting a dark current signal in the light-shielded unit pixel 42, is conducted in advance before a process of reading out a pixel signal from the unit pixel 41 described with reference to FIGS. 5 to 8.

This process of reading out a pixel signal from the light-shielded unit pixel 42 may be similar to the process of reading out a pixel signal from the unit pixel 41 described with reference to FIGS. 5 to 8. Alternatively, a pixel signal may be read out from the light-shielded unit pixel 42 by using a source follower circuit.

In any case, when a pixel signal is read out from the light-shielded unit pixel 42, the vertical scanning circuit 23 and other components drive the light-shielded unit pixel 42 in a manner similar to when a pixel signal is read out from the unit pixel 41.

This causes the charge accumulated in the PD (photodiode) of the light-shielded unit pixel 42 corresponding to the PD 151 of the unit pixel 41 to be transferred to the FD section (floating diffusion section) corresponding to the FD section 156 of the unit pixel 41. Then, a signal proportional to the charge transferred to the FD section is read out by the column signal processing section 24 via the vertical signal line 51.

That is, the comparator 112 compares a reference signal supplied from the reference signal generation circuit 111 with an output voltage signal output from the light-shielded unit pixel 42 via the vertical signal line 51, supplying a signal whose level is proportional to the comparison result thereof to the counter 113.

Also, the counter 113 performs counting operation in response to a signal supplied from the comparator 112, generating a pixel signal of the light-shielded unit pixel 42 and supplying the acquired pixel signal to the data holding section 114. It should be noted that a final pixel signal is generated as a result of comparison operation between the reset level and the signal level of the light-shielded unit pixel 42 and counting operation are performed by the comparator 112 and the counter 113.

The PD of the light-shielded unit pixel 42 is shielded from light. Therefore, a pixel signal read out from the light-shielded unit pixel 42 is a signal indicating a dark current component that occurs in the light-shielded unit pixel 42. Moreover, the light-shielded unit pixel 42 has characteristics equivalent to those of the unit pixel 41. That is, the two pixels have the same structure. Therefore, if the light-shielded unit pixel 42 is exposed to light for the same amount of time and driven in the same manner as the unit pixel 41 at the time of pixel signal readout, the pixel signal of the light-shielded unit pixel 42 is equivalent to the dark current signal that occurs in the unit pixel 41 at the time of exposure. Also, in the case where the light-shielded unit pixel 42 differs, for example, in operation from the unit pixel 41 at the time of readout, it is possible to acquire a signal equivalent to the dark current signal of the unit pixel 41 by causing the signal processing section 27 to perform calculations such as those for adjusting a gain of the pixel signal of the light-shielded unit pixel 42.

Therefore, by using the pixel signal read out from the light-shielded unit pixel 42, it is possible to generate a pseudo-dark current signal identical to a dark current signal that occurs in the unit pixel 41 at the time of pixel signal readout from the unit pixel 41.

The data holding section 114 temporarily holds the pixel signal of the light-shielded unit pixel 42 supplied from the counter 113 and supplies the held pixel signal of the light-shielded unit pixel 42 to the signal processing section 27.

The signal processing section 27 generates, on the basis of the pixel signal of the light-shielded unit pixel 42 supplied from the data holding section 114, a pseudo-voltage selection signal that provides a suitable pseudo-dark current signal and supplies the pseudo-voltage selection signal to the selector 242. That is, the signal processing section 27 generates a pseudo-voltage selection signal by performing given digital calculations on the basis of the pixel signal of the light-shielded unit pixel 42.

Also, the signal processing section 27 supplies, as appropriate, the value of the pixel signal of the light-shielded unit pixel 42 to the reference signal generation circuit 111, as well. Further, the signal processing section 27 holds the value of the pixel signal of the light-shielded unit pixel 42, i.e., the digital calculation result, at least until a frame period during which that pixel signal has been read out from the light-shielded unit pixel 42 ends (while the frame period is in progress).

The selector 242 selects a voltage signal supplied from the ladder resistors that include the resistors 241 on the basis of the pseudo-voltage selection signal supplied from the signal processing section 27, supplying the selected voltage signal to the gate of the amplifying transistor 243.

Then, the amplifying transistor 243 outputs an analog signal whose voltage value is proportional to the voltage signal supplied to its own gate as a pseudo-dark current signal.

At time t1 in FIG. 5, the switch 225 is ON, and the reset transistor 203 and the transfer transistor 202 of the dummy pixel 43 are also ON. For this reason, the pseudo-dark current signal output from the amplifying transistor 243 is supplied to the FD section 206 and the PD 201 via the switch 225, the signal line 55, and the reset transistor 203.

Next, as illustrated in FIG. 5, at time t2, the drive signal TRG_R is pulled down to low level by the vertical scanning circuit 23.

This causes the transfer transistor 202 to turn OFF in response to the drive signal TRG_R as indicated by an arrow Q13 in FIG. 6, electrically isolating the PD 201 from the FD section 206. That is, the pseudo-dark current signal is accumulated in the PD 201.

It should be noted that, at this time, the unit pixel 41 remains, as indicated by an arrow Z13, in the same state as indicated by the arrow Z11.

At time t3, as illustrated in FIG. 5, the drive signal RST_S is pulled up to high level, the drive signal SWDC is pulled down to low level, and the drive signal SWVR is pulled up to high level by the vertical scanning circuit 23.

This causes the reset transistor 153 to turn ON in response to the drive signal RST_S, electrically connecting the FD section 156 to the signal line 52. At the same time, the switch 225 turns OFF in response to the drive signal SWDC, and the switch 224 turns ON in response to the drive signal SWVR. Also, the drive signal RST_R remains at high level.

As a result, as indicated by an arrow Q14 in FIG. 7, while the pseudo-dark current signal remains accumulated in the PD 201, the charge accumulated in the FD section 206, i.e., the charge of the pseudo-dark current signal, is discharged to the reset power supply via the reset transistor 203, the signal line 55, and the switch 224. That is, the FD section 206 is reset to the level of the reset power supply (reset voltage Vrst).

At the same time, as indicated by an arrow Z14 in FIG. 7, the FD section 156 is electrically connected to the vertical signal line 51 via the signal line 52. As a result, a negative feedback is applied to the unit pixel 41, causing operation as a voltage follower circuit to be conducted. As a result, the FD section 156 and the vertical signal line 51 are set to a voltage level equivalent to that of the reset voltage Vrst by a current mirror circuit.

This achieves a balance in such a manner that the potential of the differential pair of the differential amplification circuit 191 reaches a stable operating point. At the same time, the FD section 156 is reset to a level equivalent to the reset voltage Vrst.

Also, at time t4 as illustrated in FIG. 5, the drive signal RST_S and the drive signal RST_R are pulled down to low level by the vertical scanning circuit 23.

This causes the reset transistor 203 to turn OFF in the dummy pixel 43 as indicated by an arrow Q15 in FIG. 7, electrically isolating the FD section 206 from the signal line 55 and placing the FD section 206 into a floating state.

Similarly, as indicated by an arrow Z15 in FIG. 7, the reset transistor 153 also turns OFF in the unit pixel 41, electrically isolating the FD section 156 from the signal line 52 and placing the FD section 156 into a floating state.

It should be noted that although not depicted in FIG. 7, charge such as charge injection that occurs when the reset transistor 153 is OFF flows into the FD section 156 at time t4, that is, a reset feedthrough occurs. However, an equivalent level of charge flows into the FD section 206 in the dummy pixel 43, thus causing such charge components to cancel each other as in-phase signals.

In a single-ended amplifier, the amplitude of the FD section is multiplied by an open loop gain such as approximately minus 20-fold due to a reset feedthrough, causing the output amplitude to go off scale. In the solid-state imaging element 11, however, such effects are cancelled by using a differential pair, i.e., the differential amplification circuit 191.

Referring back to the description of FIG. 5, at time t5, the drive signal TRG_R is pulled up to high level by the vertical scanning circuit 23.

This causes the transfer transistor 202 to turn ON in the dummy pixel 43 as indicated by an arrow Q16 in FIG. 7, electrically connecting the PD 201 to the FD section 206.

That is, the transfer transistor 202 turns ON, thus transferring a pseudo-dark current signal accumulated in the PD 201 to the FD section 206. In other words, the pseudo-dark current signal is input to the positive input side of the differential amplification circuit 191.

It should be noted that, as indicated by an arrow Z16 in FIG. 7, the unit pixel 41 is in the state indicated by the arrow Z15, i.e., in the same state as at time t4.

At time t5, the dummy pixel 43 is in a selected state, that is, the select transistor 205 is ON. Therefore, the potential of the FD section 206 swings in the negative direction by an equivalent of the charge accumulated in the FD section 206, i.e., in proportion to the pseudo-dark current signal.

The FD section 206 is on the positive input side of the differential amplification circuit 191. As indicated by the curve L11 illustrated in FIG. 5, therefore, the potential of the vertical signal line 51, the output of the differential amplification circuit 191, swings in proportion to the amplitude of the potential of the FD section 206 in the negative direction by an equivalent of the change in amplitude thereof, i.e., by an equivalent of the pseudo-dark current signal. At this time, the potential (level) of the vertical signal line 51 is the reset level of the unit pixel 41.

Thereafter, at time t6, the drive signal TRG_R is pulled down to low level by the vertical scanning circuit 23 as illustrated in FIG. 5.

This causes the transfer transistor 202 to turn OFF in the dummy pixel 43 as indicated by an arrow Q17 in FIG. 8, electrically isolating the PD 201 from the FD section 206 and completing the transfer of the pseudo-dark current signal to the FD section 206.

It should be noted that, as indicated by an arrow Z17 in FIG. 8, the unit pixel 41 is in the state indicated by the arrow Z16 in FIG. 7, i.e., in the same state as at time t5.

Also, by performing auto zero operation of the comparator 112 at time t6, it is possible to provide an amplitude range of the AD converter (comparator 112) for variation in reset level arising from variation in the pseudo-dark current signal component for each dummy pixel 43.

Further, when an ample settling period is provided after time t6 as illustrated in FIG. 5, AD conversion of the reset level, i.e., so-called P phase, is initiated.

Specifically, the reference signal generation circuit 111 supplies, to the comparator 112, a reference signal whose level rises linearly, i.e., in a sloped manner, from a given level (hereinafter also referred to as a level LVS) with time as indicated by the polyline L12 in FIG. 5.

Then, the comparator 112 compares the level of the reference signal supplied from the reference signal generation circuit 111 with the level of the vertical signal line 51, i.e., the level of the signal output from the differential amplification circuit 191, supplying a signal proportional to the comparison result thereof to the counter 113.

The signal output from the comparator 112 is at low level when the slope of the reference signal is initiated. When the level of the reference signal reaches the level (voltage) of the vertical signal line 51, that is, when the levels of these signals cross each other in terms of voltage, the signal output from the comparator 112 is inverted to high level.

The counter 113 starts counting from a count value of '0' as an initial value from the starting point of the reference signal slope, continues to count until the level of the signal supplied from the comparator 112 is inverted from low to high level, and increments the count value by 1. That is, the counter 113 stops counting when the level of the signal supplied from the comparator 112 is inverted to high level and holds the count value at the time of halting of the counting as a reset level (hereinafter also referred to as a first signal) of the differential amplification circuit 191, i.e., the unit pixel 41.

In FIG. 5, a period T11 is a period during which the reset level of the unit pixel 41 is read out. In the period T11, the count value of the counter 113 begins to increase after the level of the reference signal begins to rise. Also, when the signal of the comparator 112 is inverted to high level, the count value of the counter 113 stops increasing, and the count value at this time is the reset level indicated by the first signal (P phase).

When the reset level readout ends, thereafter at time t7, the drive signal TRG_S is pulled up to high level by the vertical scanning circuit 23.

This causes the transfer transistor 152 to turn ON in the unit pixel 41 as indicated by an arrow Z18 in FIG. 8, electrically connecting the PD 151 to the FD section 156 and transferring the imaging signal accumulated in the PD 151 during the exposure period to the FD section 156 via the transfer transistor 152.

As a result of such transfer of charge, the charge as an imaging signal generated by photoelectric conversion by the PD 151 during the exposure period of the unit pixel 41 and the charge of the dark current signal that actually occurs in the PD 151 during the exposure period are accumulated in the FD section 156. In other words, the imaging signal and the dark current signal are input as negative inputs of the differential amplification circuit 191.

It should be noted that, at time t7, as indicated by an arrow Q18 in FIG. 8, the dummy pixel 43 is in the state indicated by an arrow Q17, i.e., in the same state as at time t6.

At time t7, the unit pixel 41 is in a selected state, that is, the select transistor 155 is ON. Therefore, the potential of the vertical signal line 51 swings in the positive direction by an equivalent of the charge accumulated in the FD section 156, i.e., in proportion to the imaging signal and the dark current signal.

The FD section 156 is on the negative input side of the differential amplification circuit 191. As indicated by the curve L11 illustrated in FIG. 5, therefore, the potential of the vertical signal line 51, the output of the differential amplification circuit 191, swings in proportion to the amplitude of the potential of the FD section 156 in the positive direction by an equivalent of the change in amplitude thereof, i.e., by an equivalent of the imaging signal and the dark current signal. At this time, the potential (level) of the vertical signal line 51 is the signal level of the unit pixel 41.

For example, in the case where a pseudo-dark current signal is not input to the positive input side of the differential amplification circuit 191 in advance, and if the imaging signal is transferred to the FD section 156, the potential of the vertical signal line 51 swings, for example, by an equivalent of a margin H11 indicated in the portion of the curve L11 illustrated in FIG. 5.

However, the amplitude having that margin H11 includes not only a contribution of the imaging signal but also a contribution of the dark current signal that actually occurred, thus resulting in a smaller amplitude of the contribution of the imaging signal by that equivalent amount and narrowing the dynamic range of the signal level. The dynamic range of the imaging signal diminishes significantly particularly during long exposure and at high temperatures.

In contrast, in the solid-state imaging element 11, a pseudo-dark current signal is input to the positive input side of the differential amplification circuit 191 in advance. As a result, before the signal level readout, the potential of the vertical signal line 51 swings in the negative direction by an equivalent of the pseudo-dark current signal, i.e., by an equivalent of a margin H12.

When the imaging signal is transferred, in such a state, to the FD section 156 to read out the signal level, the potential of the vertical signal line 51 swings in the positive direction by an equivalent of the sum of the margin H11 and the margin H12.

Here, the contribution of the dark current signal that occurs in the unit pixel 41 in the amplitude is the margin H12, the same as the contribution of the pseudo-dark current signal in the amplitude. That is, the dark current signal is cancelled by the pseudo-dark current signal in phase with the dark current signal at the portion of the margin H12. In other words, the output amplitude produced by the dark current signal that occurred in the unit pixel 41 is cancelled by the pseudo-dark current signal. The reason for this is that the pseudo-dark current signal has the same level (voltage) as the dark current signal that occurs in the unit pixel 41.

At the time of signal level readout, therefore, it is possible to provide only the margin H11 as a contribution of the amplitude of the imaging signal at all times irrespective of the magnitude of the dark current signal, thus providing an ample dynamic range for the imaging signal.

As described above, the solid-state imaging element 11 causes the potential of the vertical signal line 51 to swing by an equivalent of the dark current component, i.e., an equivalent of the pseudo-dark current signal, in the direction opposite to the direction in which the potential of the vertical signal line 51 swings due to the signal (output voltage signal) output from the unit pixel 41, a readout pixel by inputting a pseudo-dark current signal to the dummy pixel 43, a reference pixel. This ensures that the dark current signal of the unit pixel 41 is cancelled by the pseudo-dark current signal, thus providing an ample dynamic range.

Also, as illustrated in FIG. 5, the drive signal TRG_S is pulled down to low level at time t8 by the vertical scanning circuit 23.

This causes the transfer transistor 152 to turn OFF in the unit pixel 41 as indicated by an arrow Z19 in FIG. 8, electrically isolating the PD 151 from the FD section 156 and completing the transfer of the imaging signal to the FD section 156.

It should be noted that, as indicated by an arrow Q19 in FIG. 8, the dummy pixel 43 is in the state indicated by the arrow Q18, i.e., in the same state as at time t7.

Further, after the reset level readout from the unit pixel 41, the counter 113 inverts the sign of each bit of the held first signal (reset level) by using a bit inversion circuit or other circuit provided in the counter 113. Assuming, for example, that the value of the first signal (count value) held by the counter 113 is 'P,' the value of the first signal held by the counter 113 changes to '−P' as a result of bit inversion operation.

Also, the reference signal generation circuit 111 applies a positive offset to the reference signal by an equivalent of the amplitude of the dark current signal acquired by the light-shielded unit pixel 42 in proportion to the pixel signal of the light-shielded unit pixel 42 supplied from the signal processing section 27.

That is, as indicated by the polyline L12 illustrated in FIG. 5, the reference signal generation circuit 111 increases the level of the reference signal in the positive direction by an equivalent of the dark current signal acquired by the light-shielded unit pixel 42, i.e., by an equivalent of a margin H13, the amplitude level of the pseudo-dark current signal. This allows a reference signal whose amplitude level is larger by the margin H13 than the level LVS of the reference signal up to this moment to be supplied to the comparator 112 from the reference signal generation circuit 111.

As described above, for the reference signal, by applying an offset to the amplitude level of the dark current signal that occurs in the light-shielded unit pixel 42, it is possible to acquire, as a post-AD-conversion pixel signal of the unit pixel 41 output from the counter 113, a signal whose dark current component (dark current signal) has been cancelled. That is, a pixel that includes only the imaging signal component but not the dark current component is acquired. This makes it possible to provide an ample dynamic range. As described above, the operation of applying an offset to the reference signal by an equivalent of the dark current component is so-called analog clamping.

Also, when an ample settling period is provided after time t8 as illustrated in FIG. 5, AD conversion of the signal level, i.e., so-called D phase, is initiated.

Specifically, the reference signal generation circuit 111 supplies, to the comparator 112, a reference signal whose level rises in a sloped manner from a level acquired by adding a level equivalent to the margin H13 to the above level LVS.

Then, the comparator 112 compares the level of the reference signal supplied from the reference signal generation circuit 111 with the level of the vertical signal line 51, i.e., the level of the signal output from the differential amplification circuit 191 (output voltage signal), supplying a signal proportional to the comparison result thereof to the counter 113.

The signal output from the comparator 112 is at low level when the slope of the reference signal is initiated. When the level of the reference signal reaches the level (voltage) of the vertical signal line 51, the signal output from the comparator 112 is inverted to high level.

The counter 113 starts counting from the value obtained by inverting the bits of the first signal, i.e., from the above P' as an initial value from the starting point of the reference signal slope and continues to count until the level of the signal supplied from the comparator 112 is inverted from low to high level, and increments the count value by 1. That is, the counter 113 stops counting when the level of the signal supplied from the comparator 112 is inverted to high level and holds the count value at the time of halting of the counting as a second signal.

We assume, for example, that the signal level of the unit pixel 41, the value indicating the D phase is 'D.' In this case, a value of 'D–P' is acquired as the second signal by the counting operation whose initial value is '–P.'

Such a second signal is a pixel value of the unit pixel 41 that has been subjected to digital CDS in which the P phase is subtracted from the D phase. That is, the second signal is a pixel signal of the unit pixel 41 that indicates the amount of photocharge acquired by photoelectric conversion of incident light on the unit pixel 41 during the exposure period.

As described above, the column signal processing section 24 having the comparators 112 and the counters 113 generates a pixel signal of the unit pixel 41 on the basis of the reset level of the unit pixel 41 that includes the pseudo-dark current signal component and the signal level of the unit pixel 41 that does not include the pseudo-dark current signal component but includes the dark current signal component and the imaging signal component. Here, a signal level that does not include the pseudo-dark current signal component is acquired by applying an offset to the reference signal, and when the difference between the reset level and the signal level is found, the dark current signal component is cancelled by the pseudo-dark current signal component of the reset level, thus allowing only the imaging signal component to be extracted.

In FIG. 5, a period T12 is a period during which the signal level of the unit pixel 41 is read out. In the period T12, the count value of the counter 113 begins to increase after the level of the reference signal begins to rise. Also, when the signal of the comparator 112 is inverted to high level, the count value of the counter 113 stops increasing, and the count value at this time is the second signal, i.e., the difference between the signal level and the reset level.

The pixel signal of the unit pixel 41 acquired as described above is supplied from the counter 113 to the data holding section 114 and output, at a proper timing, to the signal processing section 27 and so on from the data holding section 114.

Thanks to the above operation, the solid-state imaging element 11 cancels the dark current signal that occurs in the unit pixel 41 by inputting a pseudo-dark current signal to the dummy pixel 43, a reference pixel on the positive input side of the differential pair of the differential amplification circuit 191, thus reading out the pixel signal of the unit pixel 41.

This makes it possible to cancel the dark current component in a manner tailored to the imaging conditions such as exposure time (charge accumulation time) and temperature by using the differential amplification circuit 191 that is capable of readout with high conversion efficiency from charge to voltage signal, thus providing an ample dynamic range. That is, it is possible to eliminate variations of the dynamic range of the pixel signal of the unit pixel 41 caused by the imaging conditions.

In particular, the present embodiment can reduce noise in the pixel signal by suppressing fixed pattern noise through CDS even when the pseudo-dark current signal (reset level) acquired in the dummy pixel 43 varies significantly.

<Driving Example for Detection of the Dark Current Signal>

As described above, the solid-state imaging element 11 carries out the detection of a dark current signal in the light-shielded unit pixel 42 in advance before reading out a pixel signal from the unit pixel 41.

Figure 9:
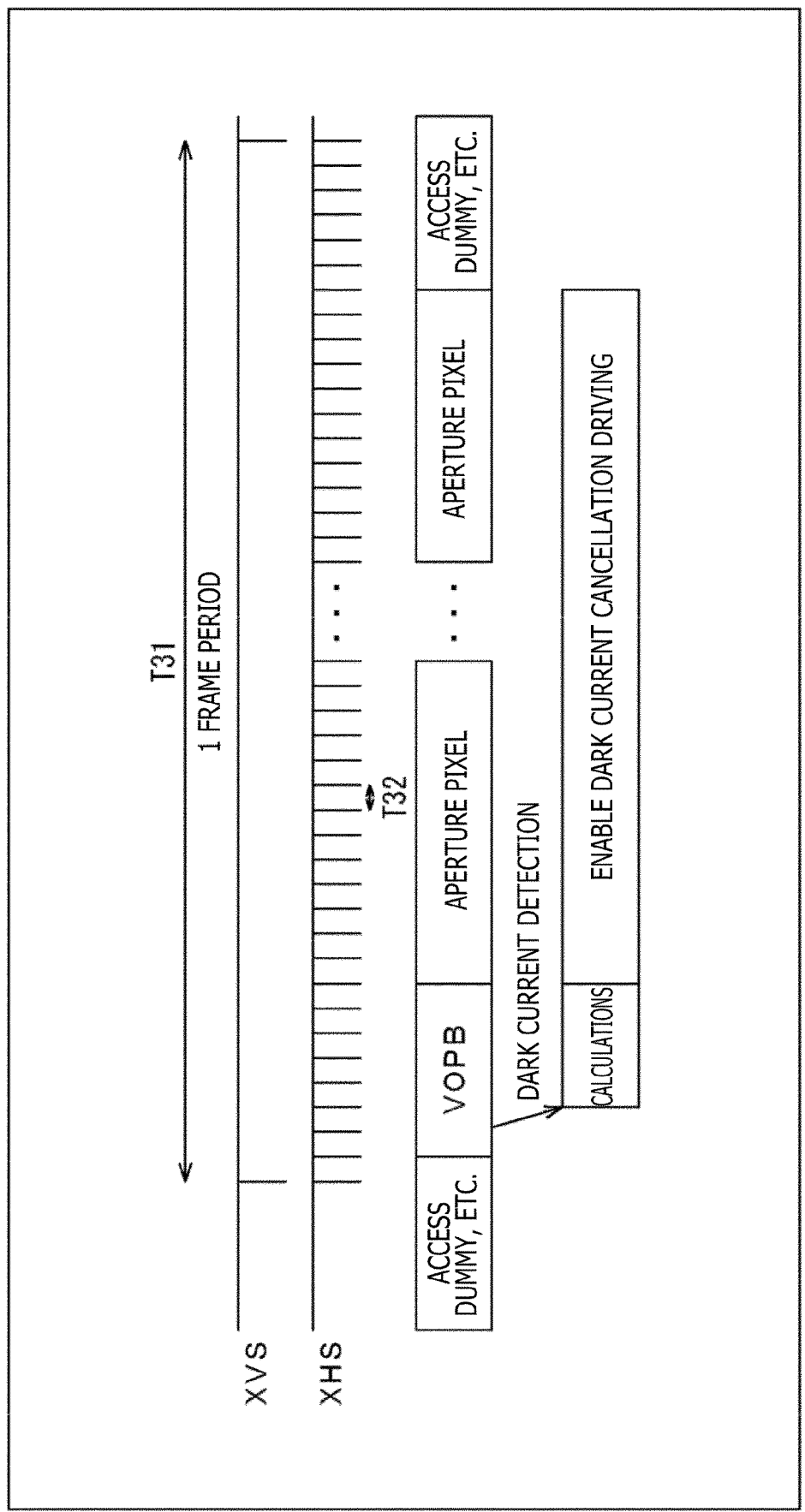
FIG. 9 is a diagram describing detection of a dark current signal.

Such detection of a dark current signal and readout of a pixel signal from the unit pixel 41 by using the detection result are conducted, for example, at timings as illustrated in FIG. 9. It should be noted that the horizontal direction in FIG. 9 represents time.

In the example illustrated in FIG. 9, vertical straight lines in the diagram of the portion denoted by characters 'XVS' indicate boundary positions of a period of the image captured by the solid-state imaging element 11, i.e., a frame's worth of the image that includes the pixel signals of all the unit pixels 41. For example, a period T31 spans over a frame.

Also, in the diagram of the portion denoted by characters 'XHS,' the vertical straight lines indicate the boundary positions of the period for processing one row of pixels within the period that spans over a frame's worth of the image captured by the solid-state imaging element 11. That is, for example, a period T32 spans over one row of pixels.

In the pixel array section 21, there are cases in which various pixels other than aperture pixels defined as effective pixels, i.e., the unit pixels 41 from which pixel signals included in image signals are to be read out, are accessed.

Specifically, for example, the column signal processing section 24 reads out pixel signals from light-shielded OPB pixels that are used to acquire a reference black level and accesses an access dummy row when there is some leeway in time within the one-frame period.

In the solid-state imaging element 11, for example, the light-shielded unit pixel 42 is used not only as an OPB pixel for acquiring a reference black level but also as a pixel from which to read out a dark current signal.

The light-shielded unit pixel 42 has characteristics equivalent to those of the unit pixel 41. Therefore, a dark current signal equivalent to that of the unit pixel 41, an aperture pixel, is accumulated in the light-shielded unit pixel 42. For this reason, a pixel row including the light-shielded unit pixels 42 is selected in the time period from when the one-frame period begins to when the pixel signal readout period from the unit pixels begins, and pixel signals are read out from these light-shielded unit pixels 42 for detection of a dark current signal.

In FIG. 9, pixel signals are read out from the light-shielded unit pixels 42 during the period denoted by characters 'VOPB' after the beginning of the period T31.

Also, the digital data value of the dark current signal changes even for the same dark current signal, due, for example, to analog gain setting.

For this reason, the signal processing section 27 performs, for example, calculations for generating pseudo-voltage selection signals that provide suitable pseudo-dark current signals on the basis of digital pixel signals of the light-shielded unit pixels 42 acquired by the detection. That is, the signal processing section 27 performs, for example, calculations for converting pixel signals of the light-shielded unit pixels 42 into pseudo-voltage selection signals.

In FIG. 9, the signal processing section 27 performs calculations for generating pseudo-voltage selection signals and other tasks in the period denoted by characters 'CALCULATIONS.'

When pseudo-voltage selection signals or other signals are acquired as a result of dark current signal detection as described above, dark current cancellation driving for supplying pseudo-dark current signals to the dummy pixels 43 is enabled thereafter.

That is, at latest before the pixel signal readout from the unit pixels 41, aperture pixels, begins, the dark current cancellation driving is performed. In the period during which the dark current cancellation driving is enabled, the pseudo-signal generation section 28 outputs pseudo-dark current signals on the basis of the pseudo-voltage selection signals. Thereafter, the pixel rows, each including the unit pixels 41, are selected in sequence, and pixel signals are read out from the unit pixels 41 in each selected pixel row.

In FIG. 9, the period denoted by characters 'APERTURE PIXEL' indicates a period during which pixel signals are read out from the unit pixels 41, and the period denoted by characters 'ENABLE DARK CURRENT CANCELLATION DRIVING' indicates a period during which dark current cancellation driving is performed.

For example, the period T32 indicates a period during which pixel signals are read out from one row of pixels, and the period T32 begins from time t0 illustrated in FIG. 5 and ends at time t8 illustrated in FIG. 5. Also, the ending time of the period T32 is also time t0 for reading out pixel signals from a next row of pixels of the unit pixels 41.

Then, when image signals for a frame's worth of an image are acquired following pixel signal readout from the unit pixels 41 in all the rows of pixels, tasks such as accessing of the access dummy row are performed in the period denoted by characters 'ACCESS DUMMY, ETC.' thereafter, as a result of which the one-frame period ends.

As described above, in the solid-state imaging element 11, a dark current signal is detected for each image frame, thus allowing for proper cancellation of dark current components of the unit pixels 41 in a manner tailored to changes in the external environment such as temperature and imaging settings such as accumulation time (exposure time).

Second Embodiment

<Configuration Example of the Imaging Apparatus>

Also, the present technology is applicable, for example, to an imaging apparatus having the solid-state imaging element 11 illustrated in FIG. 1.

Figure 10:
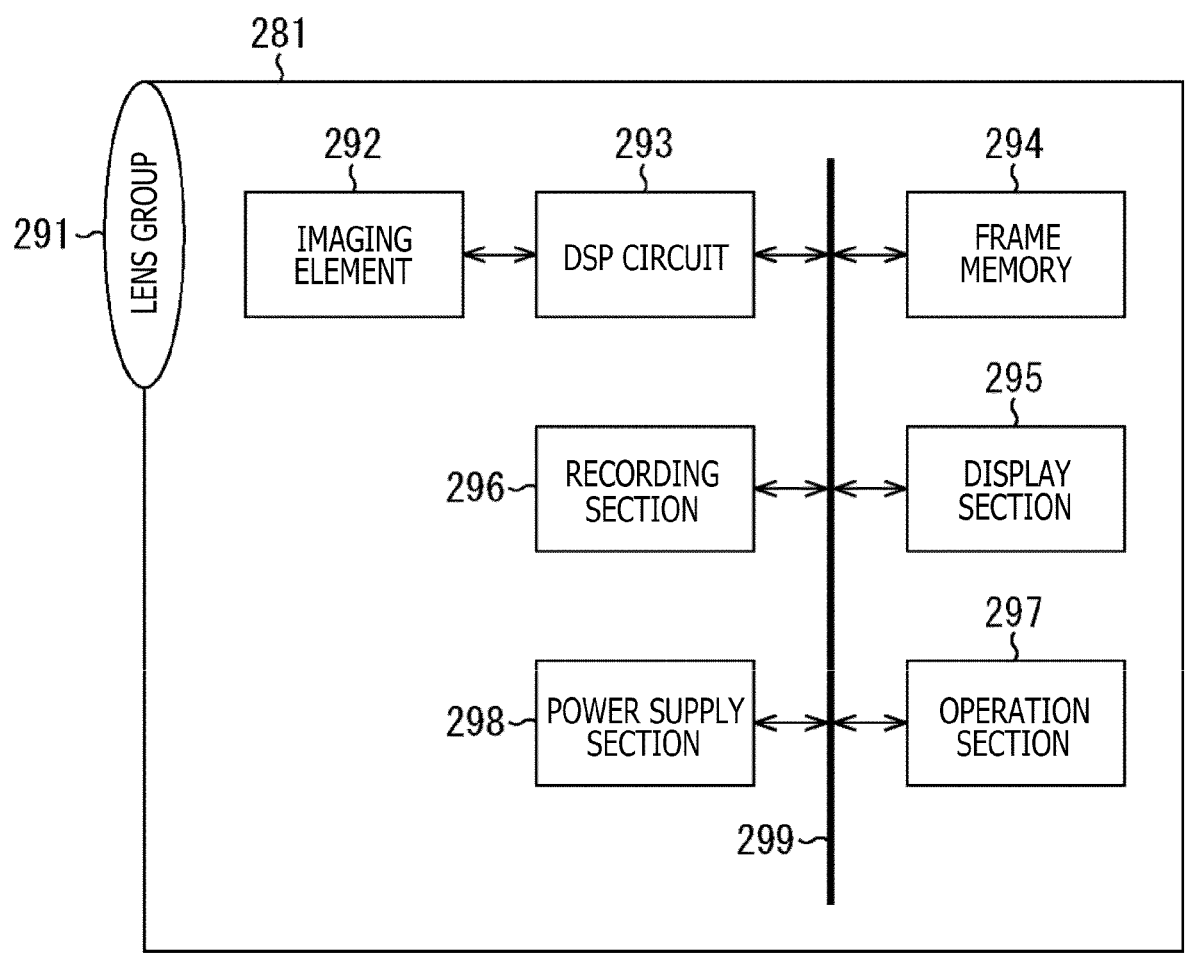
FIG. 10 is a diagram illustrating a configuration example of an imaging apparatus.

In such a case, the imaging apparatus to which the present technology is applied is configured, for example, as illustrated in FIG. 10.

An imaging apparatus 281 illustrated in FIG. 10 includes, for example, a digital video camera, a digital still camera, a camera module designed for mobile equipment, or other device.

The imaging apparatus 281 has an optics 291 including a lens group and so on, an imaging element 292, a DSP (Digital Signal Processor) circuit 293, a frame memory 294, a display section 295, a recording section 296, an operation section 297, and a power supply section 298. Also, the DSP circuit 293 to the power supply section 298 are connected to each other via a bus line 299.

The optics 291 captures incident light (image light) from a subject and forms an image on an imaging surface of the imaging element 292. The imaging element 292 converts the amount of incident light whose image has been captured on the imaging surface by the optics 291 into an electric signal and outputs the signal as an image signal.

The imaging element 292 corresponds to the solid-state imaging element 11 illustrated in FIG. 1, and an image signal that includes pixel signals read out from the respective unit pixels of the imaging element 292 is supplied to the DSP circuit 293 as a digital image signal.

The DSP circuit 293 functions as a signal processing section that handles predetermined processing tasks on the image signal supplied from the imaging element 292. For example, the DSP circuit 293 performs various processing tasks such as white balance adjustment and noise removal process on the image signal acquired by imaging of the imaging element 292 and then loads the signal into the frame memory 294.

The display section 295 includes a liquid crystal display panel or an organic EL (Electro Luminescence) panel and displays a video or a still image, an image captured by the imaging element 292. The recording section 296 records the video or the still image, an image captured by the imaging element 292, to a DVD (Digital Versatile Disk) or other recording media.

The operation section 297 issues operating instructions regarding various functions of the imaging apparatus 281 under user operation. The power supply section 298 supplies, as appropriate, various power supplies, operating power sources of the DSP circuit 293, the frame memory 294, the display section 295, the recording section 296, and the operation section 297, to these target components.

It should be noted that although a description has been given here of an example in which the present technology is applied to an imaging apparatus, the present technology is applicable, in addition to the above, to a variety of pieces of electronic equipment including mobile phone having an imaging function.

Third Embodiment

<Other Driving Example of the Solid-State Imaging Element>

Also, the driving of the solid-state imaging element 11 is not limited to that illustrated in FIG. 5, and the solid-state imaging element 11 may be driven in any manner as long as the dark current signal can be cancelled in the unit pixel 41 by inputting a pseudo-dark current signal to the dummy pixel 43.

In the example illustrated in FIG. 5, for example, the drive signal TRG_R was pulled up to high level at time t5 before the reset level was acquired, and the pseudo-dark current signal was transferred to the FD section 206 as a positive input to the differential amplification circuit 191. However, the pseudo-dark current signal may be transferred to the FD section 206 at an equivalent timing to, i.e., at approximately the same timing as, that for transferring the imaging signal to the FD section 156. Such driving is particularly effective when the solid-state imaging element 11 has no leeway to swing the potential of the vertical signal line 51 in the negative direction.

Figure 11:
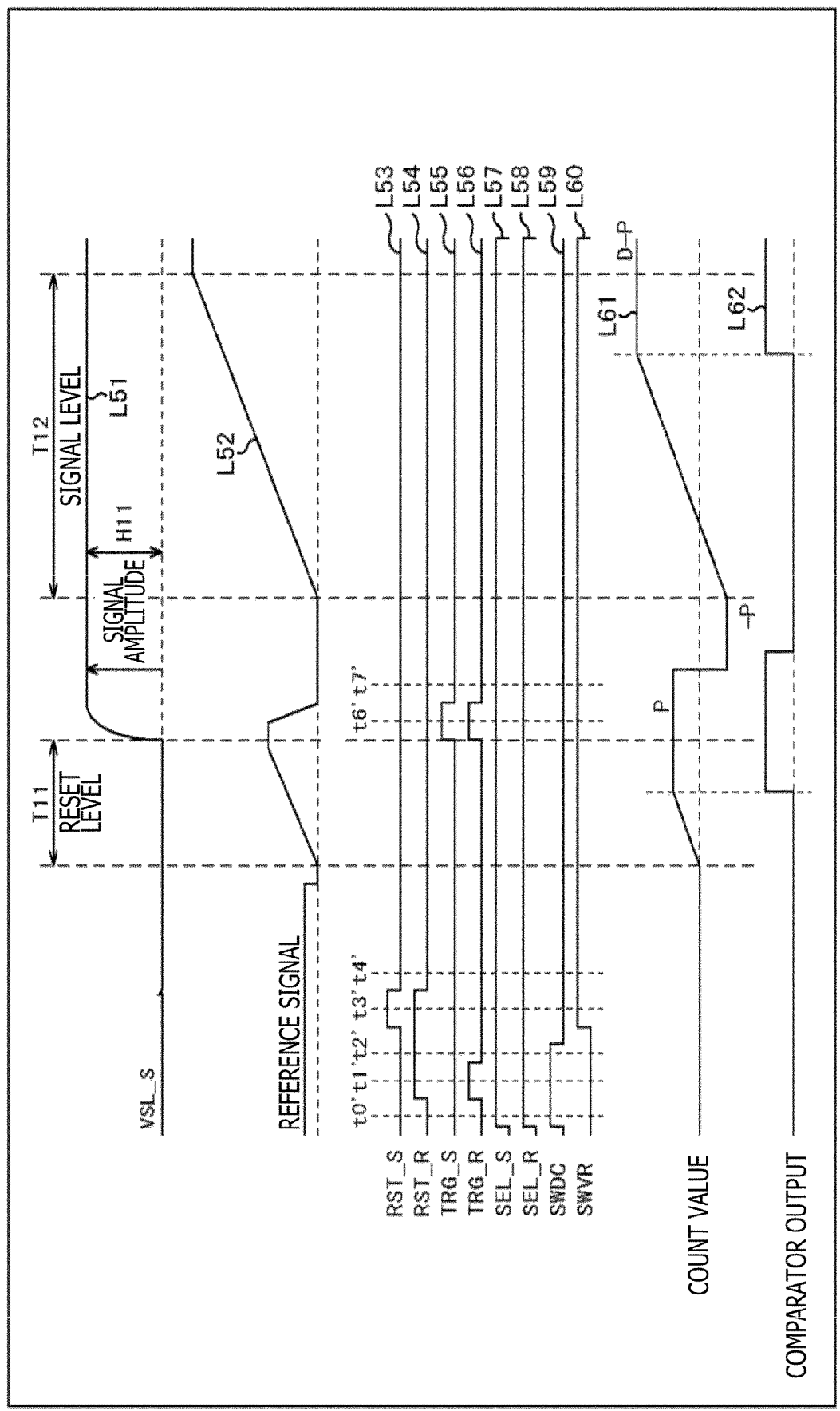
FIG. 11 is a diagram describing an example of driving the solid-state imaging element.

For example, in the case where the transfer of the pseudo-dark current signal to the FD section 206 and the transfer of the imaging signal to the FD section 156 take place approximately at the same timing, each section of the solid-state imaging element 11 is driven as illustrated in FIG. 11. It should be noted that the portions in FIG. 11 corresponding to those in FIG. 5 are denoted by the same reference symbols and description thereof will be omitted as appropriate.

It should be noted that the horizontal direction in FIG. 11 indicates time. Also, a curve L51 in FIG. 11 indicates the level (voltage) of the vertical signal line 51 at each time, and a polyline L52 indicates the level of the reference signal output from the reference signal generation circuit 111 at each time.

In FIG. 11, polylines L53 to L60 indicate levels (waveforms) of the drive signal RST_S, the drive signal RST_R, the drive signal TRG_S, the drive signal TRG_R, the drive signal SEL_S, the drive signal SEL_R, the drive signal SWDC, and the drive signal SWVR, respectively.

Here, when each of the drive signal RST_S to the drive signal SWVR is upwardly projected, this indicates that the drive signal is at high level, and when each of the drive signal RST_S to the drive signal SWVR is downwardly projected, this indicates that the drive signal is at low level.

Further, in FIG. 11, a polyline L61 indicates a count value of the counter 113 at each time, and a polyline L62 indicates an output signal of the comparator 112 at each time.

In the example illustrated in FIG. 11, of the driving of the respective sections of the unit pixel 41 and the dummy pixel 43 indicated by the polylines L53 to L60, only the driving of the transfer transistor 202 of the dummy pixel 43 is different from the case in FIG. 5.

That is, the polylines L53 to L55 and the polylines L57 to L60 illustrated in FIG. 11 are identical to the polylines L13 to L15 and the polylines L17 to L20 illustrated in FIG. 5 in driving waveform, and only the polyline L56 illustrated in FIG. 11 is different from the polyline L16 in FIG. 5.

Therefore, the solid-state imaging element 11 is driven from time t0' to time t4' in FIG. 11 in completely the same manner as the solid-state imaging element 11 is driven from time t0 to time t4 in FIG. 5. Therefore, the driving at the respective times will be omitted to avoid repeated description.

At time t4', the unit pixel 41 is in the state indicated by the arrow Z15 in FIG. 7, and the dummy pixel 43 is in the state indicated by the arrow Q15 in FIG. 7.

In the solid-state imaging element 11, a reset level is read out during the period T11 after time t4' similarly during the period T11 illustrated in FIG. 5.

It should be noted, however, that, in this case, the transfer transistor 202 of the dummy pixel 43 is OFF, and therefore, no pseudo-dark current signal is accumulated in the FD section 206, that is, no pseudo-dark current signal is input as a positive input of the differential amplification circuits 191. For this reason, the potential of the vertical signal line 51 remains at the potential of the operating point rather than swinging in the negative direction. During the period T11, therefore, the potential of the operating point of the differential amplification circuit 191 is read out.

When the reset level is read out, thereafter at time t6', the drive signal TRG_S and the drive signal TRG_R are pulled up to high level by the vertical scanning circuit 23.

This causes the transfer transistor 152 to turn ON in the unit pixel 41, transferring the imaging signal accumulated in the PD 151 during the exposure period to the FD section 156 via the transfer transistor 152. At this time, the dark current signal is transferred to the FD section 156 together with the imaging signal.

Also, in the dummy pixel 43, the transfer transistor 202 turns ON, transferring the pseudo-dark current signal, input from the pseudo-signal generation section 28, to the FD section 206 via the transfer transistor 202.

Thanks to these transfer operations, the pseudo-dark current signal has been input to the positive input side of the differential amplification circuit 191, and the imaging signal and the dark current signal have been input to the negative input side of the differential amplification circuit 191.

At time t6', the unit pixel 41 and the dummy pixel 43 are in a selected state. For this reason, the potential of the vertical signal line 51 swings in proportion to the charge accumulated in the FD section 156, i.e., the imaging signal and the dark current signal, and the pseudo-dark current signal accumulated in the FD section 206, by an equivalent of the pseudo-dark current signal, the imaging signal, and the dark current signal.

In particular, here, the pseudo-dark current signal, a negative input to the differential pair, and the dark current signal, a positive input to the differential pair, have the same voltage level and are in phase. Therefore, the dark current signal is cancelled by the pseudo-dark current signal in the vertical signal line 51, the output end of the differential amplification circuit 191.

As a result, the potential of the vertical signal line 51 swings in the positive direction by an equivalent of the imaging signal on the negative input side as indicated by the curve L51 in FIG. 11, thus providing the margin H11 as a contribution of the amplitude of the imaging signal similarly to the case illustrated in FIG. 5. Also in this case, therefore, it is possible to provide an ample dynamic range of the pixel signal of the unit pixel 41 irrespective of the magnitude of the dark current signal, i.e., imaging conditions and so on.

Further, at time t7', the drive signal TRG_S and the drive signal TRG_R are pulled down to low level by the vertical scanning circuit 23.

This causes the transfer transistor 152 to turn OFF in the unit pixel 41, electrically isolating the PD 151 from the FD section 156 and completing the transfer of the imaging signal to the FD section 156.

Similarly, in the dummy pixel 43, the transfer transistor 202 turns OFF, electrically isolating the PD 201 from the FD section 206 and completing the transfer of the pseudo-dark current signal to the FD section 206.

When the transfer operation of the imaging signal and the pseudo-dark current signal ends as described above, the signal level readout is performed thereafter during the period T12 similar to the period T12 illustrated in FIG. 5.

Then, the second signal acquired by the signal level readout, i.e., the pixel signal of the unit pixel 41, is output from the counter 113 to the signal processing section 27 via the data holding section 114. It should be noted that, here, no offset proportional to the pixel signal read out from the light-shielded unit pixel 42 is applied to the reference signal unlike the example illustrated in FIG. 5.

In this example, the column signal processing section 24 generates a pixel signal of the unit pixel 41 on the basis of the reset level of the unit pixel 41 that does not include the pseudo-dark current signal component and the signal level of the unit pixel 41 that includes the pseudo-dark current signal component, the dark current signal component, and the imaging signal component.

In this case, the signal level includes the dark current signal component that actually occurred in the unit pixel 41 and the pseudo-dark current signal component whose phase has been inverted, thus causing the dark current signal component to be cancelled by this pseudo-dark current signal component.

As described above, it is possible, by transferring the imaging signal and the pseudo-dark current signal, i.e., inputting the imaging signal and the pseudo-dark current signal to the differential amplification circuit 191, at the same time, to cancel the dark current signal with the pseudo-dark current signal and provide an ample dynamic range of the pixel signal.

Fourth Embodiment

<Configuration Example of the Solid-State Imaging Element>

Incidentally, a description has been given of the example in which the unit pixel 41 and the dummy pixel 43 are used to form the differential pair of the differential amplification circuit 191 in the solid-state imaging element 11 illustrated in FIG. 1. However, the two arbitrary unit pixels 41 of the pixel array section 21 may be used to form the differential amplification circuit 191.

Figure 12:
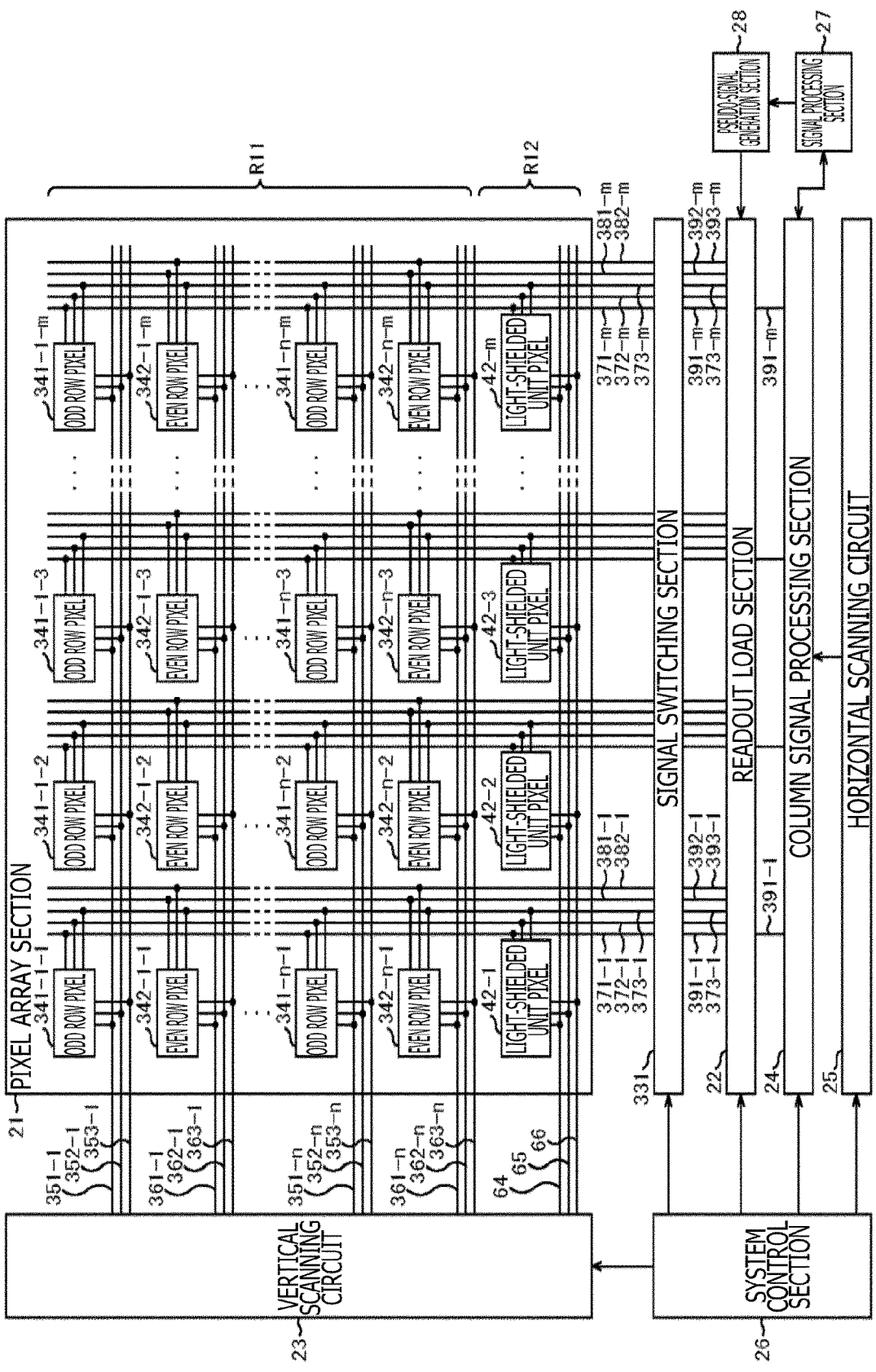
FIG. 12 is a diagram illustrating a configuration example of the solid-state imaging element.

In such a case, the solid-state imaging element 11 is configured, for example, as illustrated in FIG. 12. It should be noted that the portions in FIG. 12 corresponding to those in FIG. 1 are denoted by the same reference symbols and description thereof will be omitted as appropriate.

The solid-state imaging element 11 illustrated in FIG. 12 has the pixel array section 21, a signal switching section 331, the readout load section 22, the vertical scanning circuit 23, the column signal processing section 24, the horizontal scanning circuit 25, the system control section 26, the signal processing section 27, and the pseudo-signal generation section 28.

The solid-state imaging element 11 illustrated in FIG. 12 differs in configuration to the solid-state imaging element 11 illustrated in FIG. 1 in that the pixel array section 21 has no dummy pixels 43 and that the signal switching section 331, a new component, is provided, but is identical thereto in all other respects.

In the example illustrated in FIG. 12, pixels corresponding to the unit pixels 41 are arranged in a matrix form in the region R11, an effective pixel region of the pixel array section 21.

That is, in the region R11, of the pixel rows including the pixels corresponding to the unit pixels 41, odd row pixels 341-1-1 to 341-*n*-*m* are provided as pixels included in each of the odd rows located in odd numbered rows from top in the figure.

Here, each pixel row includes m pixels, and the first odd row includes, for example, the odd row pixels 341-1-1 to 341-1-*m*. Also, for example, the nth odd row includes odd row pixels 341-*n*-1 to 341-*n*-*m*.

It should be noted that, hereinafter, in the case where there is no particular need to distinguish between the odd row pixels 341-*k*-1 to 341-*k*-*m* (where 1≤k≤n), these pixels will be also simply referred to as the odd row pixels 341-*k*. Also, hereinafter, in the case where there is no particular need to distinguish between the odd row pixels 341-1 to 341-*n*, these pixels will be also simply referred to as the odd row pixels 341.

Similarly, in the region R11, of the pixel rows including the pixels corresponding to the unit pixels 41, even row pixels 342-1-1 to 342-*n*-*m* are provided as pixels included in each of the even rows located in even numbered rows from top in the figure.

For example, the first even row, i.e., the second pixel row of all the pixel rows, includes, for example, the even row pixels 342-1-1 to 342-1-*m*. Also, for example, the nth even row includes even row pixels 342-*n*-1 to 342-*n*-*m*.

It should be noted that, hereinafter, in the case where there is no particular need to distinguish between the even row pixels 342-*k*-1 to 342-*k*-*m* (where 1≤k≤n), these pixels will be also simply referred to as the even row pixels 342-*k*. Also, hereinafter, in the case where there is no particular need to distinguish between the even row pixels 342-1 to 342-*n*, these pixels will be also simply referred to as the even row pixels 342.

These odd row pixels 341 and even row pixels 342 have the same configuration as the unit pixels 41 illustrated in FIG. 1. That is, of the unit pixels 41, those provided in the odd rows are the odd row pixels 341, and of the unit pixels 41, those in the even rows are the even row pixels 342.

Also, in this example, the odd row pixel 341 and the even row pixel 342 are paired as a differential pair of the differential amplification circuit 191.

In particular, here, it is possible to switch which pixel to use as a reference pixel between the odd row pixel 341 and the even row pixel 342 included in the differential pair.

Specifically, when a pixel signal is read out from the odd row pixel 341, the even row pixel 342 is used as a reference pixel (reference side), and when a pixel signal is read out from the even row pixel 342, the odd row pixel 341 is used as a reference pixel.

In an image frame, for example, we focus on the given odd row pixel 341 and consider the reference pixel when a pixel signal is read out from that given odd row pixel 341. In this case, when a pixel signal is read out from the given odd row pixel 341, the even row pixel 342 from which the pixel signal of the same frame has already been read out can be used as a reference pixel for the given odd row pixel 341.

Also, the odd row pixel 341 and the even row pixel 342 are connected to the vertical scanning circuit 23 by signal lines and are driven by drive signals supplied via these signal lines.

Specifically, for example, the pixel row (odd row) that includes the odd row pixels 341-*k* (where 1≤k≤n) is connected to a signal line 351-*k* for placing the odd row pixels 341 in that pixel row into a selected state, a signal line 352-*k* for resetting the odd row pixels 341-*k*, and a signal line 353-*k* for transferring charge within the odd row pixels 341-*k*.

That is, a drive signal SEL_O corresponding to the above drive signal SEL_S is supplied to the odd row pixels 341-*k* from the vertical scanning circuit 23 via the signal line 351-*k*, and a drive signal RST_O corresponding to the above drive signal RST_S is supplied via the signal line 352-*k*. Also, a drive signal TRG_O corresponding to the above drive signal TRG_S is supplied to the odd row pixels 341-*k* from the vertical scanning circuit 23 via the signal line 353-*k*.

It should be noted that, hereinafter, in the case where there is no particular need to distinguish between the signal lines 351-1 to 351-*n*, these signal lines will be also simply referred to as the signal lines 351 and that in the case where there is no particular need to distinguish between the signal lines 352-1 to 352-*n*, these signal lines will be also simply referred to as the signal lines 352. Also, in the case where there is no particular need to distinguish between the signal lines 353-1 to 353-*n*, these signal lines will be also simply referred to as the signal lines 353.

Similarly, for example, the pixel row (even row) that includes the even row pixels 342-*k* (where 1≤k≤.n) is connected to a signal line 361-*k* for placing the even row pixels 342 in that pixel row into a selected state, a signal line 362-*k* for resetting the even row pixels 342-*k*, and a signal line 363-*k* for transferring charge within the even row pixels 342-*k*.

That is, a drive signal SEL_E corresponding to the above drive signal SEL_S is supplied to the even row pixels 342-*k* from the vertical scanning circuit 23 via the signal line 361-*k*, and a drive signal RST_E corresponding to the above drive signal RST_S is supplied via the signal line 362-*k*. Also, a drive signal TRG_E corresponding to the above drive signal TRG_S is supplied to the even row pixels 342-*k* from the vertical scanning circuit 23 via the signal line 363-*k*.

It should be noted that, hereinafter, in the case where there is no particular need to distinguish between the signal lines 361-1 to 361-*n*, these signal lines will be also simply referred to as the signal lines 361 and that in the case where there is no particular need to distinguish between the signal lines 362-1 to 362-*n*, these signal lines will be also simply referred to as the signal lines 362. Also, in the case where there is no particular need to distinguish between the signal lines 363-1 to 363-*n*, these signal lines will be also simply referred to as the signal lines 363.

In the pixel array section 21, only the light-shielded unit pixels 42 are provided in the region R12 outside the effective pixel region, and no dummy pixels 43 illustrated in FIG. 1 are provided.

Further, the signal switching section 331 is provided in the solid-state imaging element 11 illustrated in FIG. 12, and the signal switching section 331 switches which pixel to use as a reference pixel between the odd row pixel 341 and the even row pixel 342 included in the differential pair.

It should be noted that, hereinafter, of the pixels included in the differential pair of the differential amplification circuit 191, the pixel which is not the reference pixel and from which a pixel signal is read out will be also referred to as a readout pixel.

The signal switching section 331 is connected to the odd row pixels 341 in the kth column (where 1≤k≤m) by a vertical signal line 371-*k* for reading out a signal, a signal line 372-*k* for inputting a pseudo-dark current signal, and a signal line 373-*k* connected to the tail current source.

Hereinafter, in the case where there is no particular need to distinguish between the vertical signal lines 371-1 to 371-*m*, these vertical signal lines will be also simply referred to as the vertical signal lines 371 and that in the case where there is no particular need to distinguish between the signal lines 372-1 to 372-*m*, these signal lines will be also simply referred to as the signal lines 372. Also, in the case where there is no particular need to distinguish between the signal lines 373-1 to 373-*m*, these signal lines will be also simply referred to as the signal lines 373.

Similarly, the signal switching section 331 is connected to the light-shielded unit pixel 42 in the kth column (where 1≤k≤m) by the vertical signal line 371-*k*, the signal line 372-*k*, and the signal line 373-*k*.

The signal switching section 331 is connected to the even row pixels 342 in the kth column (where 1≤k≤m) by a vertical signal line 381-*k* for reading out a signal, a signal line 382-*k* for inputting a pseudo-dark current signal, and the signal line 373-*k* connected to the tail current source.

Hereinafter, in the case where there is no particular need to distinguish between the vertical signal lines 381-1 to 381-*m*, these vertical signal lines will be also simply referred to as the vertical signal lines 381 and that in the case where there is no particular need to distinguish between the signal lines 382-1 to 382-*m*, these signal lines will be also simply referred to as the signal lines 382.

Further, the signal switching section 331 is connected to circuitry of the readout load section 22 for the kth pixel column (where 1≤k≤m) by a vertical signal line 391-*k* and a vertical signal line 392-*k* for reading out signals, a signal line 393-*k* for inputting a pseudo-dark current signal, and the signal line 373-*k* connected to the tail current source.

Hereinafter, in the case where there is no particular need to distinguish between the vertical signal lines 391-1 to 391-*m*, these vertical signal lines will be also simply referred to as the vertical signal lines 391 and that in the case where there is no particular need to distinguish between the vertical signal lines 392-1 to 392-*m*, these vertical signal lines will be also simply referred to as the vertical signal lines 392. Also, in the case where there is no particular need to distinguish between the signal lines 393-1 to 393-*m*, these signal lines will be also simply referred to as the signal lines 393.

<Configuration Example of the Differential Amplification Circuit>

In the solid-state imaging element 11 illustrated in FIG. 12, the odd row pixel 341, the even row pixel 342, the readout load section 22, and the signal switching section 331 are used to form the differential amplification circuit 191.

Figure 13:
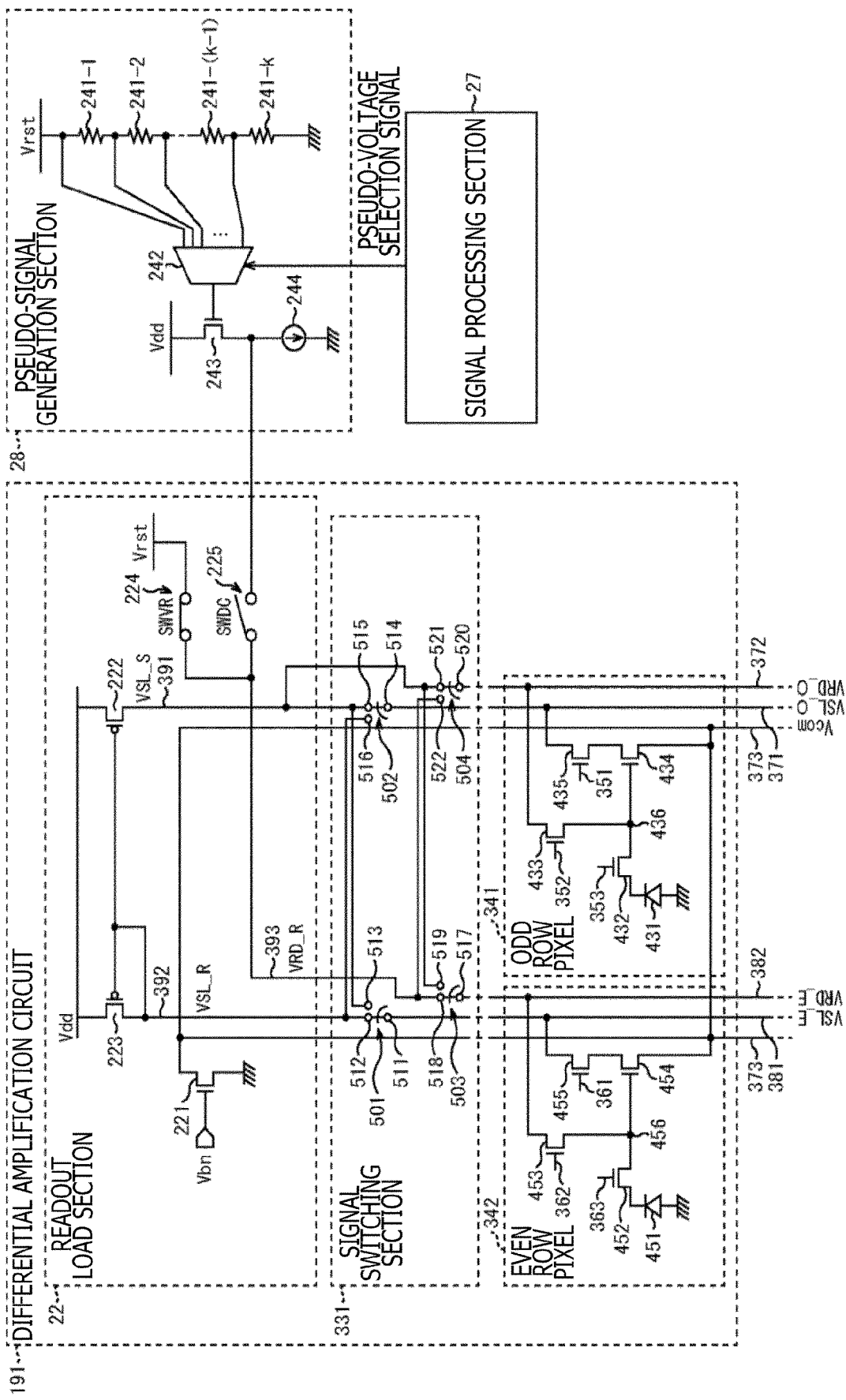
FIG. 13 is a diagram illustrating a configuration example of a differential amplification circuit.

In this case, the differential amplification circuit 191 is configured, for example, as illustrated in FIG. 13. It should be noted that the portions in FIG. 13 corresponding to those in FIG. 4 or 12 are denoted by the same reference symbols and description thereof will be omitted as appropriate.

In the example illustrated in FIG. 13, the readout load section 22 and the pseudo-signal generation section 28 are configured in the same manner as in the case illustrated in FIG. 4.

The odd row pixel 341 has a photodiode 431, a transfer transistor 432, a reset transistor 433, an amplifying transistor 434, a select transistor 435, and a floating diffusion section 436.

The photodiode 431 to the floating diffusion section 436 correspond, respectively, to the PD 151 to the FD section 156 of the unit pixel 41 and are laid out with the same connection relationship as the PD 151 to the FD section 156. It should be noted that the photodiode 431 will be also referred to as the PD 431 and that the floating diffusion section 436 will be also referred to as the FD section 436.

In the odd row pixel 341, the select transistor 435 has its gate connected to the signal line 351, the reset transistor 433 has its gate connected to the signal line 352, and the transfer transistor 432 has its gate connected to the signal line 353.

Also, the reset transistor 433 has its drain connected to the signal line 372 denoted by characters 'VRD_O,' and the amplifying transistor 434 has its source connected to the signal line 373 denoted by characters 'Vcom,' and the select transistor 435 has its drain connected to the vertical signal line 371 denoted by characters 'VSL_O.'

Similarly, the even row pixel 342 has a photodiode 451, a transfer transistor 452, a reset transistor 453, an amplifying transistor 454, a select transistor 455, and a floating diffusion section 456.

The photodiode 451 to the floating diffusion section 456 correspond, respectively, to the PD 151 to the FD section 156 of the unit pixel 41 and are laid out with the same connection relationship as the PD 151 to the FD section 156. It should be noted that the photodiode 451 will be also referred to as the PD 451 and that the floating diffusion section 456 will be also referred to as the FD section 456.

In the even row pixel 342, the select transistor 455 has its gate connected to the signal line 361, the reset transistor 453 has its gate connected to the signal line 362, and the transfer transistor 452 has its gate connected to the signal line 363.

Also, the reset transistor 453 has its drain connected to the signal line 382 denoted by characters 'VRD_E,' and the amplifying transistor 454 has its source connected to the signal line 373, and the select transistor 455 has its drain connected to the vertical signal line 381 denoted by characters 'VSL_E.'

The signal switching section 331 has switches 501 to 504, a group of selector switches.

The switch 501 has nodes 511 to 513 and switches a connection destination of the node 511 to the node 512 or the node 513.

The switch 502 has nodes 514 to 516 and switches a connection destination of the node 514 to the node 515 or the node 516.

The switch 503 has nodes 517 to 519 and switches a connection destination of the node 517 to the node 518 or the node 519.

The switch 504 has nodes 520 to 522 and switches a connection destination of the node 520 to the node 521 or the node 522.

Here, the node 511 of the switch 501 is connected to the vertical signal line 381.

The node 512 is connected to the vertical signal line 392 denoted by characters 'VSL_R' and the node 516 of the switch 502. Also, the vertical signal line 392 is connected to the drain of the load transistor 223 included in the current mirror circuit.

The node 513 is connected to the node 515 of the switch 502 and the vertical signal line 391 denoted by characters 'VSL_S.' The vertical signal line 391 is connected to the drain of the load transistor 222 included in the current mirror circuit and the comparator 112 of the column signal processing section 24.

The node 514 of the switch 502 is connected to the vertical signal line 371.

The node 515 is connected to the node 519 of the switch 503 and the node 521 of the switch 504 via the vertical signal line 391.

The node 517 of the switch 503 is connected to the signal line 382. Also, the node 518 is connected to the switch 224 and the switch 225 via the signal line 393 denoted by characters 'VRD_R' and also connected to the node 522 of the switch 504. The node 519 is connected to the node 521 of the switch 504.

Further, the node 520 of the switch 504 is connected to the signal line 372.

In the differential amplification circuit 191 configured as described above, one of the odd row pixel 341 and the even row pixel 342 is used as a readout pixel, and the other is used as a reference pixel as a result of switching of the connections of the switches 501 to 504.

For example, in the case where the odd row pixel 341 is used as a readout pixel and the even row pixel 342 is used as a reference pixel, the node 511 of the switch 501 is connected to the node 512, and the node 514 of the switch 502 is connected to the node 515.

Also, the node 517 of the switch 503 is connected to the node 518, and the node 520 of the switch 504 is connected to the node 521.

This causes the vertical signal line 392 (VSL_R) connected to the load transistor 223 of the current mirror circuit to be electrically connected to the vertical signal line 381 (VSL_E) via the switch 501.

This also causes the vertical signal line 391 (VSL_S) connected to the load transistor 222 of the current mirror circuit to be electrically connected not only to the vertical signal line 371 (VSL_O) via the switch 502 but also to the signal line 372 (VRD_O) via the switch 504.

Further, the signal line 393 (VRD_R) is electrically connected to the signal line 382 (VRD_E) via the switch 503.

As a result, the pseudo-dark current signal output from the amplifying transistor 243 is input to the FD section 456 of the even row pixel 342, a reference pixel, via the switch 225, the signal line 393, the switch 503, and the signal line 382.

Also, a signal proportional to the charge accumulated in the FD section 436 of the odd row pixel 341, a readout pixel, is supplied to the comparator 112 of the column signal processing section 24 via the vertical signal line 371, the switch 502, and the vertical signal line 391.

In such a case, the solid-state imaging element 11 is driven, for example, in a similar manner to that described with reference to FIG. 5, after which a pixel signal is read out from the odd row pixel 341, a readout pixel.

That is, the vertical scanning circuit 23 drives the reset transistor 433 by supplying the drive signal RST_O having the same waveform as the polyline L13 illustrated in FIG. 5 to the gate of the reset transistor 433. Also, the vertical scanning circuit 23 drives the reset transistor 453 by supplying the drive signal RST_E having the same waveform as the polyline L14 illustrated in FIG. 5 to the gate of the reset transistor 453.

The vertical scanning circuit 23 drives the transfer transistor 432 by supplying the drive signal TRG_O having the same waveform as the polyline L15 illustrated in FIG. 5 to the gate of the transfer transistor 432 and drives the transfer transistor 452 by supplying the drive signal TRG_E having the same waveform as the polyline L16 illustrated in FIG. 5 to the gate of the transfer transistor 452.

Further, the vertical scanning circuit 23 drives the select transistor 435 by supplying the drive signal SEL_O having the same waveform as the polyline L17 illustrated in FIG. 5 to the gate of the select transistor 435 and drives the select transistor 455 by supplying the drive signal SEL_E having the same waveform as the polyline L18 illustrated in FIG. 5 to the gate of the select transistor 455.

It should be noted that the switch 224, the switch 225, the reference signal generation circuit 111, the comparator 112, the counter 113, the signal processing section 27, and the pseudo-signal generation section 28 are driven in completely the same manner as in the case described with reference to FIG. 5.

This makes it possible to read out a pixel signal from the odd row pixel 341 by using the odd row pixel 341 as a readout pixel and the even row pixel 342 as a reference pixel, thus providing an ample dynamic range of the pixel signal.

In contrast, for example, in the case where the even row pixel 342 is used as a readout pixel and the odd row pixel 341 is used as a reference pixel, the node 511 of the switch 501 is connected to the node 513, and the node 514 of the switch 502 is connected to the node 516.

Also, the node 517 of the switch 503 is connected to the node 519, and the node 520 of the switch 504 is connected to the node 522.

This causes the vertical signal line 392 (VSL_R) connected to the load transistor 223 of the current mirror circuit to be electrically connected to the vertical signal line 371 (VSL_O) via the switch 502.

This also causes the vertical signal line 391 (VSL_S) connected to the load transistor 222 of the current mirror circuit to be electrically connected not only to the vertical signal line 381 (VSL_E) via the switch 501 but also to the signal line 382 (VRD_E) via the switch 503.

Further, the signal line 393 (VRD_R) is electrically connected to the signal line 372 (VRD_O) via the switch 504.

As a result, the pseudo-dark current signal output from the amplifying transistor 243 is input to the FD section 436 of the odd row pixel 341, a reference pixel, via the switch 225, the signal line 393, the switch 504, and the signal line 372.

Also, a signal proportional to the charge accumulated in the FD section 456 of the even row pixel 342, a readout pixel, is supplied to the comparator 112 of the column signal processing section 24 via the vertical signal line 381, the switch 501, and the vertical signal line 391.

In such a case, the solid-state imaging element 11 is driven, for example, in a similar manner to that described with reference to FIG. 5, after which a pixel signal is read out from the even row pixel 342, a readout pixel.

That is, the vertical scanning circuit 23 drives the reset transistor 453 by supplying the drive signal RST_E having the same waveform as the polyline L13 illustrated in FIG. 5 to the gate of the reset transistor 453. Also, the vertical scanning circuit 23 drives the reset transistor 433 by supplying the drive signal RST_O having the same waveform as the polyline L14 illustrated in FIG. 5 to the gate of the reset transistor 433.

The vertical scanning circuit 23 drives the transfer transistor 452 by supplying the drive signal TRG_E having the same waveform as the polyline L15 illustrated in FIG. 5 to the gate of the transfer transistor 452 and drives the transfer transistor 432 by supplying the drive signal TRG_O having the same waveform as the polyline L16 illustrated in FIG. 5 to the gate of the transfer transistor 432.

Further, the vertical scanning circuit 23 drives the select transistor 455 by supplying the drive signal SEL_E having the same waveform as the polyline L17 illustrated in FIG. 5 to the gate of the select transistor 455 and drives the select transistor 435 by supplying the drive signal SEL_O having the same waveform as the polyline L18 illustrated in FIG. 5 to the gate of the select transistor 435.

It should be noted that the switch 224, the switch 225, the reference signal generation circuit 111, the comparator 112, the counter 113, the signal processing section 27, and the pseudo-signal generation section 28 are driven in completely the same manner as in the case described with reference to FIG. 5.

This makes it possible to read out a pixel signal from the even row pixel 342 by using the even row pixel 342 as a readout pixel and the odd row pixel 341 as a reference pixel, thus providing an ample dynamic range of the pixel signal.

In the present embodiment, the odd row pixel 341 and the even row pixel 342, aperture pixels adjacent to each other, are used to form a differential pair rather than using a dummy pixel whose position is fixed, thus keeping pixel-to-pixel variations in pixel characteristics small and providing an excellent in-phase signal removal ratio. Therefore, the solid-state imaging element 11 illustrated in FIG. 12 allows for pixel signal readout with low noise.

Also, the pixel used as a reference pixel may be any kind of pixel as long as a pixel signal is read out at a different timing from the readout pixel.

For example, when a pixel signal is read out from the readout pixel in a given image frame, it is only necessary to select, as a reference pixel, a pixel whose pixel signal readout operation has already been completed in the same frame such as pixel whose pixel signal readout operation has been completed immediately before the pixel signal readout from the readout pixel. This makes it possible to keep restrictions on the charge accumulation time (exposure period) in the readout pixel to a minimum.

Fifth Embodiment

<Pixel Structure of the Solid-State Imaging Element>

Incidentally, in the solid-state imaging element 11 whose configuration is illustrated in FIGS. 1 and 12, the differential amplification circuit 191 is formed to read out a pixel signal, thus resulting in an increased number of interconnects in the pixels.

For this reason, applying the present technology to a back-illuminated solid-state imaging element ensures reduced disadvantages such as decline in sensitivity than applying the present technology to a front-illuminated solid-state imaging element.

For this reason, the pixel peripheral circuits such as the readout load section 22, the vertical scanning circuit 23, the column signal processing section 24, the horizontal scanning circuit 25, the signal switching section 331, the system control section 26, the signal processing section 27, and the pseudo-signal generation section 28 may be arranged in a manner stacked one on top of the other on a substrate different from that on which the pixel array section 21 is formed.

Figure 14:
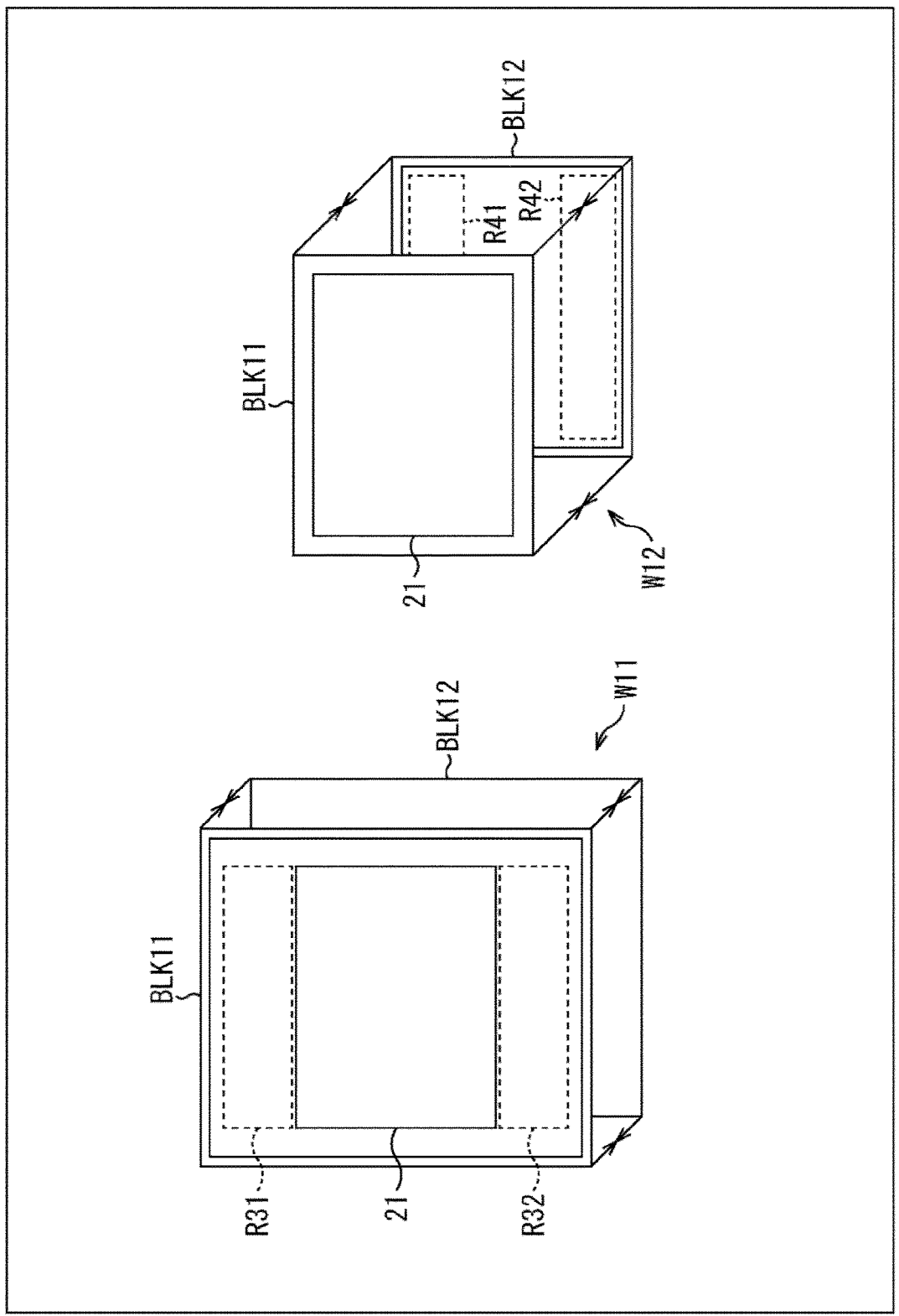
FIG. 14 is a diagram illustrating an example of application to a back-illuminated image sensor.

That is, for example, in the case where the present technology is applied to an ordinary back-illuminated image sensor, pixel peripheral circuits such as the pixel array section 21 and the readout load section 22 are formed on a given substrate BLK11 as indicated by an arrow W11 in FIG. 14. It should be noted that the portions in FIG. 14 corresponding to those in FIG. 1 are denoted by the same reference symbols and description thereof will be omitted as appropriate.

Here, the pixel array section 21 is formed at a central portion of the substrate BLK11, and pixel peripheral circuits such as the readout load section 22 are formed in portions of regions R31 and R32 located around the pixel array section 21.

Then, the substrate BLK11 and a substrate BLK12, a silicon substrate for supporting purpose, are affixed together, that is, the substrate BLK11 is stacked on top of the substrate BLK12, thus forming a back-illuminated image sensor corresponding to the solid-state imaging element 11 illustrated in FIGS. 1 and 12.

In the present technology, however, a current mirror circuit including pMOS transistors and various types of selector switches such as the switch 225 for supplying pseudo-dark current signals are required to form the differential amplification circuit 191. In addition, the pseudo-signal generation section 28 and other circuits are also required. This results in a tendency for the pixel peripheral circuits to grow in area.

For this reason, it is possible to suppress the increase in area, for example, by forming a stacked back-illuminated image sensor having the pixel array section 21 and pixel peripheral circuits provided on different substrates as indicated by an arrow W12.

That is, in the example indicated by the arrow W12, the pixel array section 21 is formed on the substrate BLK11, and the pixel peripheral circuits such as the readout load section 22 are formed in portions of regions R41 and R42 of the substrate BLK12.

Then, the substrate BLK11 and the substrate BLK12 are affixed together, thus forming a stacked back-illuminated image sensor corresponding to the solid-state imaging element 11 illustrated in FIGS. 1 and 12 to which the present technology is applied.

Such a stacked back-illuminated image sensor can keep down a chip area of the image sensor itself. Also, a stacked back-illuminated image sensor allows for manufacturing of the substrate BLK11 on which the pixels are formed by using a process designed specifically for pixels and the substrate BLK12 on which the pixel peripheral circuits are formed by using a process designed specifically for pixel peripheral circuits. Thanks to these, it is possible to reduce costs and enhance performance of the solid-state imaging element 11.

It should be noted that although all the pixel peripheral circuits are formed on the side of the substrate BLK12 in the example indicated by the arrow W12, at least some of the pixel peripheral circuits may be formed on the side of the substrate BLK12 with the remaining some of the pixel peripheral circuits formed on the side of the substrate BLK11.

<Usage Examples of the Solid-State Imaging Element>

Figure 15:
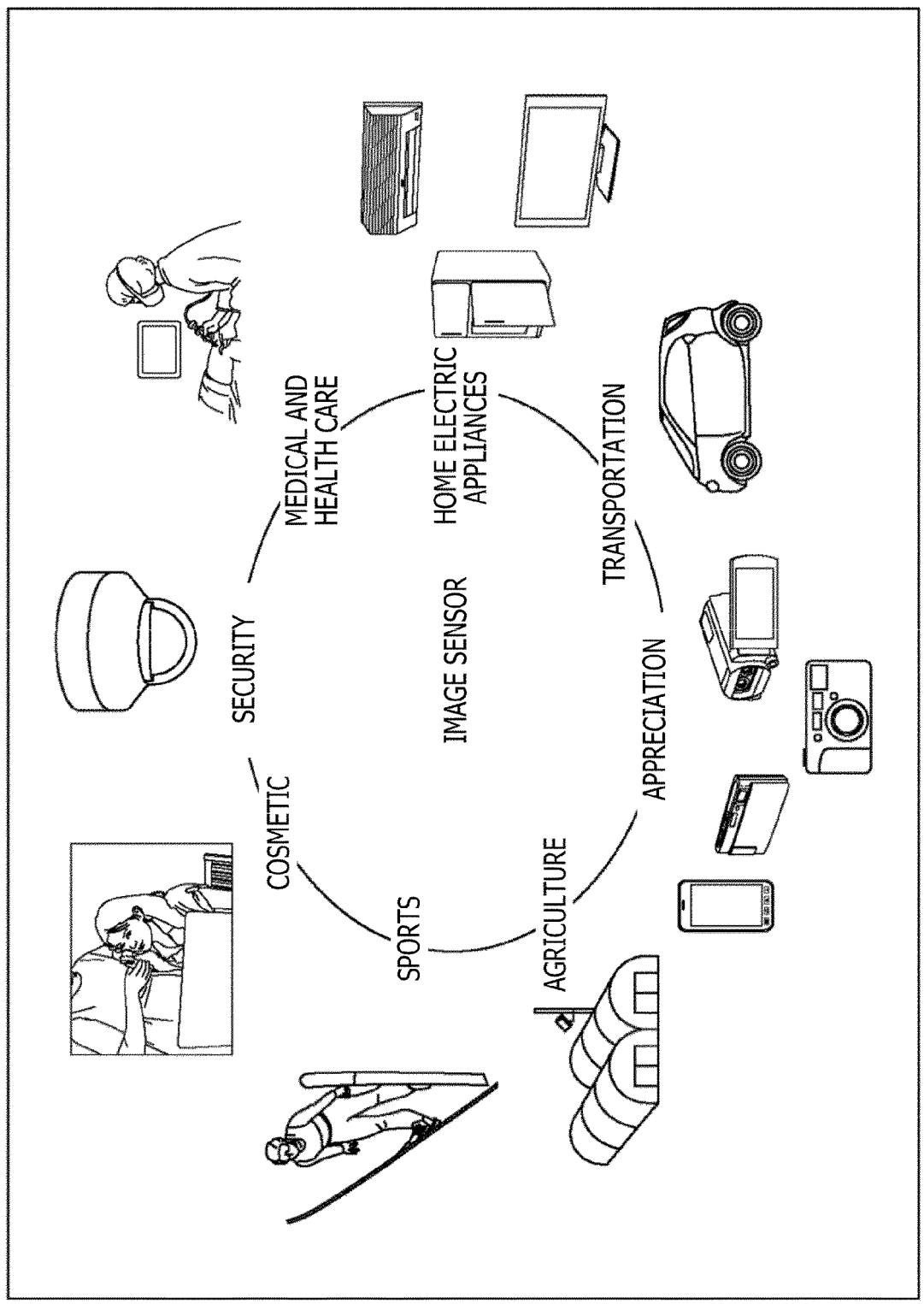
FIG. 15 is a diagram illustrating usage examples in which the solid-state imaging element is used.

FIG. 15 is a diagram illustrating usage examples in which the solid-state imaging element 11 described above is used.

The solid-state imaging element 11 described above can find application, for example, in a variety of cases where visible light, infrared light, ultraviolet light, X-ray, and other light are sensed as described below.

- Apparatuses for shooting images for appreciation such as digital camera and mobile phone having a camera function
- Apparatuses for traffic use such as vehicle-mounted sensor for shooting front, back, surroundings, inside, and so on of an automobile for safe driving such as automatic stop and for recognition of driver's state, monitoring camera for monitoring traveling vehicles and road, and distance measuring sensor for measuring vehicle-to-vehicle distance and so on
- Apparatuses for use in home electric appliances such as TV, refrigerator, and air-conditioner to shoot a user's gesture and operate the appliance in accordance with the gesture
- Apparatuses for medical and healthcare use such as endoscope and apparatus for shooting blood vessels by receiving infrared light
- Apparatuses for security use such as monitoring camera for crime prevention and camera for individual authentication
- Apparatuses for cosmetic use such as skin measuring device for shooting skin and microscope for shooting scalp
- Apparatuses for sports use such as action camera and wearable camera for sports applications
- Apparatuses for agricultural use such as camera for monitoring fields and crops It should be noted that embodiments of the present technology are not limited to those described above and can be modified in various ways without departing from the gist of the present technology.

Further, the present technology can have the following configurations:

(1)

A solid-state imaging element including:

a pixel array section having a readout pixel from which a pixel signal proportional to an amount of incident light is read out and a reference pixel having characteristics similar to those of the readout pixel; and a readout load section that forms a differential amplification circuit together with the readout pixel and the reference pixel and that inputs, to the reference pixel, a pseudo-dark current signal corresponding to a dark current signal that occurs in the readout pixel so as to cancel the dark current signal.

(2)

The solid-state imaging element of feature (1), in which the readout pixel and the reference pixel are used to form a differential pair of the differential amplification circuit.

(3)

The solid-state imaging element of feature (1) or (2), in which the reference pixel is provided on a positive input side of the differential amplification circuit and the readout pixel is provided on a negative input side of the differential amplification circuit.

(4)

The solid-state imaging element of any one of features (1) to (3), in which the reference pixel includes a dummy pixel located outside an effective region where the readout pixel is provided.

(5)

The solid-state imaging element of feature (4), in which a light-receiving surface of the dummy pixel is shielded from light.

(6)

The solid-state imaging element of any one of features (1) to (3), in which, when a pixel signal is read out from the readout pixel, another readout pixel whose pixel signal readout has already been completed is used as the reference pixel.

(7)

The solid-state imaging element of any one of features (1) to (6), further including:

a pseudo-signal generation section adapted to generate the pseudo-dark current signal on the basis of a pixel signal read out from a light-shielded pixel having characteristics equivalent to those of the readout pixel and whose light-receiving surface is shielded from light.

(8)

The solid-state imaging element of feature (7), in which the pseudo-dark current signal includes an analog voltage signal or an analog current signal.

(9)

The solid-state imaging element of any one of features (1) to (8), in which the pixel signal of the readout pixel is generated on the basis of a reset level of the readout pixel that includes the pseudo-dark current signal component and a signal level of the readout pixel that does not include the pseudo-dark current signal component but includes the dark current signal component.

(10)

The solid-state imaging element of any one of features (1) to (8), in which the pixel signal of the readout pixel is generated on the basis of a reset level of the readout pixel that does not include the pseudo-dark current signal component and a signal level of the readout pixel that includes the pseudo-dark current signal component and the dark current signal component.

(11)

The solid-state imaging element of any one of features (1) to (10), in which the solid-state imaging element includes a back-illuminated imaging element.

(12)

The solid-state imaging element of feature (11), in which the solid-state imaging element includes:

a first substrate on which the pixel array section is formed; and a second substrate on which pixel peripheral circuits including the readout load section are formed.

(13)

An imaging apparatus including:

a pixel array section having a readout pixel from which a pixel signal proportional to an amount of incident light is read out and a reference pixel having characteristics similar to those of the readout pixel; and a readout load section that forms a differential amplification circuit together with the readout pixel and the reference pixel and that inputs, to the reference pixel, a pseudo-dark current signal corresponding to a dark current signal that occurs in the readout pixel so as to cancel the dark current signal.

REFERENCE SIGNS LIST

11 Solid-state imaging element, 21 Pixel array section, 22 Readout load section, 23 Vertical scanning circuit, 24 Column signal processing section, 27 Signal processing section, 28 Pseudo-signal generation section, 41-1-1 to 41-*n*-*m*, 41 Unit pixels, 42-1 to 42-*m*, 42 Light-shielded unit pixels, 43-1 to 43-*m*, 43 Dummy pixels, 191 Differential amplification circuit, 331 Signal switching section

The invention claimed is:

1. A solid-state imaging element comprising:
a pixel array section having a readout pixel from which a pixel signal proportional to an amount of incident light is read out and a reference pixel having characteristics similar to those of the readout pixel; and
a readout load section that forms a differential amplification circuit together with the readout pixel and the reference pixel and that inputs, to the reference pixel, a pseudo-dark current signal corresponding to a dark current signal that occurs in the readout pixel so as to cancel the dark current signal.

2. The solid-state imaging element of claim 1, wherein the readout pixel and the reference pixel are used to form a differential pair of the differential amplification circuit.

3. The solid-state imaging element of claim 1, wherein the reference pixel is provided on a positive input side of the differential amplification circuit and the readout pixel is provided on a negative input side of the differential amplification circuit.

4. The solid-state imaging element of claim 1, wherein the reference pixel includes a dummy pixel located outside an effective region where the readout pixel is provided.

5. The solid-state imaging element of claim 4, wherein a light-receiving surface of the dummy pixel is shielded from light.

6. The solid-state imaging element of claim 1, wherein, when the pixel signal is read out from the readout pixel, another readout pixel whose pixel signal readout has already been completed is used as the reference pixel.

7. The solid-state imaging element of claim 1, further comprising:
a pseudo-signal generation section adapted to generate the pseudo-dark current signal on a basis of a pixel signal read out from a light-shielded pixel having characteristics equivalent to those of the readout pixel and whose light-receiving surface is shielded from light.

8. The solid-state imaging element of claim 7, wherein the pseudo-dark current signal includes an analog voltage signal or an analog current signal.

9. The solid-state imaging element of claim 1, wherein the pixel signal of the readout pixel is generated on a basis of a reset level of the readout pixel that includes a pseudo-dark current signal component and a signal level of the readout pixel that does not include the pseudo-dark current signal component but includes a dark current signal component.

10. The solid-state imaging element of claim 1, wherein the pixel signal of the readout pixel is generated on a basis of a reset level of the readout pixel that does not include a pseudo-dark current signal component and a signal level of the readout pixel that includes the pseudo-dark current signal component and a dark current signal component.

11. The solid-state imaging element of claim 1, wherein the solid-state imaging element includes a back-illuminated imaging element.

12. The solid-state imaging element of claim 11, wherein the solid-state imaging element includes:
a first substrate on which the pixel array section is formed; and
a second substrate on which pixel peripheral circuits including the readout load section are formed.

13. An imaging apparatus comprising:
a pixel array section having a readout pixel from which a pixel signal proportional to an amount of incident light is read out and a reference pixel having characteristics similar to those of the readout pixel; and
a readout load section that forms a differential amplification circuit together with the readout pixel and the reference pixel and that inputs, to the reference pixel, a pseudo-dark current signal corresponding to a dark current signal that occurs in the readout pixel so as to cancel the dark current signal.

* * * * *